US012784220B2

(12) United States Patent
Dissanayake et al.

(10) Patent No.: US 12,784,220 B2
(45) Date of Patent: Nov. 3, 2026

(54) ARTIFICIAL INTELLIGENCE(AI)-BASED SYSTEMS AND METHODS FOR GENERATING AND EVALUATING RECONSTRUCTED MULTI-SPECTRAL IMAGES DEPICTING SKIN

(71) Applicant: The Procter & Gamble Company, Cincinnati, OH (US)

(72) Inventors: Dissanayake Mudiyanselage Mahathma Bandara Dissanayake, Mason, OH (US); Alex David Towriss, Maineville, OH (US); Paul Jonathan Matts, Addleston (GB); Karen Kay Kalla, Cincinnati, OH (US); Lucian Dumitrescu, Deerfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 205 days.

(21) Appl. No.: 18/801,950

(22) Filed: Aug. 13, 2024

(65) Prior Publication Data

US 2026/0051059 A1 Feb. 19, 2026

(51) Int. Cl.

*G06T 7/00* (2017.01)
*G06Q 30/0601* (2023.01)
*G06T 11/00* (2026.01)

(52) U.S. Cl.

CPC ....... *G06T 7/0014* (2013.01); *G06Q 30/0631* (2013.01); *G06T 11/00* (2013.01);

(Continued)

(58) Field of Classification Search

CPC ..... A61B 5/0075; A61B 5/0077; A61B 5/442; A61B 5/443; A61B 5/444; A61B 5/445;

(Continued)

(56) References Cited

U.S. PATENT DOCUMENTS

2022/0003671 A1* 1/2022 Ghosh .................. G01N 21/293
2022/0110581 A1* 4/2022 Thubagere Jagadeesh ................ G06N 3/09

(Continued)

OTHER PUBLICATIONS

Salimi, Mohammadhossein, et al. "Machine learning-assisted short-wave infrared (SWIR) techniques for biomedical applications: towards personalized medicine." Journal of Personalized Medicine 14.1 (2023): 33. (Year: 2023).*

(Continued)

*Primary Examiner* — Chineyere Wills-Burns
*Assistant Examiner* — Emmanuel Silva-Avina
(74) *Attorney, Agent, or Firm* — Alexandra S. Anoff

(57) ABSTRACT

Artificial intelligence-based systems and methods are described for generating and evaluating reconstructed multi-spectral images depicting skin. A digital image of a user is received at an imaging application (app) and comprises pixel data of at least a portion of a skin area of the user. A hyper-spectral (HS) reconstruction model, trained with pixel data of a plurality of digital images depicting human skin, outputs one or more reconstructed HS images, which can be used as input to one or more AI models. The imaging app generates, based on output from the one or more AI models, user-specific comparison data of the user, reconstructed HS images of the user, or mapping data of the user.

20 Claims, 11 Drawing Sheets

(52) U.S. Cl.
CPC ............... *G06T 2207/20081* (2013.01); *G06T 2207/20084* (2013.01); *G06T 2207/30088* (2013.01); *G06T 2210/41* (2013.01)

(58) Field of Classification Search
CPC ..... A61B 5/6898; A61B 5/7267; A61B 5/743; G06Q 30/0631; G06T 2207/20081; G06T 2207/20084; G06T 2207/30088; G06T 2210/41; G06T 11/00; G06T 7/0014; G16H 30/40; G16H 50/20
USPC .......................................................... 382/128
See application file for complete search history.

(56) References Cited

U.S. PATENT DOCUMENTS

| | | | | |
|---|---|---|---|---|
| 2022/0392598 | A1* | 12/2022 | Giles .................... | A61B 5/0075 |
| 2023/0255544 | A1* | 8/2023 | Goyal .................. | A61B 5/1032 600/306 |

OTHER PUBLICATIONS

16790 PCT Search Report and Written Opinion for PCT/US2025/041730 dated Dec. 16, 2025, 15 pages.
Aliaga C et al.“A Hyperspectral Space of Skin Tones forInverse Rendering of Biophysical Skin Properties”, Computer Graphics Forum , vol. 42, No. 4, XPXP093341478, Jul. 1, 2023, pp. 03 pages.
Arlos Aliaga et al: “Estimation of 1-15 Spectral Biophysical Skin Properties from Captured RGB Albedo”, Retrieved from Internet: https://arxiv.org/,XP091140987, Jan. 26, 2022, 17 pages.
Jung G et al“Generation of skin tone and pigmented region-modified images using a pigment discrimination model trained with anoptical approach”, Skin Research and Technology, vol. 29, No. 10, XP093341480,Oct. 1, 2023,4 pages.

* cited by examiner

ARTIFICIAL INTELLIGENCE(AI)-BASED SYSTEMS AND METHODS FOR GENERATING AND EVALUATING RECONSTRUCTED MULTI-SPECTRAL IMAGES DEPICTING SKIN

FIELD

The present disclosure generally relates to artificial intelligence (AI)-based systems and methods, and, more particularly, to AI-based systems and methods for generating and evaluating reconstructed multi-spectral images depicting skin.

BACKGROUND

Human skin can be unique for given individuals, where variations of the skin can be based on, e.g., race, age, exposure to the sun, etc. Individuals can have one or more skin issues, conditions, or concerns, including, but not limited to, e.g., pigmented spots, wrinkles and/or fine lines, acne, pores, sagging and/or loss of elasticity, uneven texture, skin thinning, dryness, oiliness, sensitivity, uneven skin tone, eczema, and/or dermatitis. Such uniqueness and diversity of the skin creates difficulties for respective individuals to identify products that can treat or otherwise mitigate their respective unique combination of concerns. Moreover, once a product is identified, it can be difficult to determine what kind of difference or impact such a product can make to a given individual's skin.

Hyperspectral imaging (HSI) comprises a type of sensing technology that can capture detailed, high-resolution images by collecting data across a wide range of electromagnetic wavelengths (spectral bands) simultaneously. This allows for the creation of highly accurate and detailed maps of various materials, substances, and features. Typically, in hyperspectral imaging, a sensor records reflected or emitted radiation from the target area, which can be at hundreds to thousands of narrow spectral bands, and which typically spans the visible, near-infrared (NIR), short-wave infrared (SWIR), and thermal infrared (TIR) regions. Hyperspectral data can be used to identify specific materials or substances by analyzing their distinct spectral signatures across one or more spectral bands, which are often characteristic of particular chemical compositions or physical properties.

When applied to biological tissue, HS imaging can be used to capture the unique spectral signatures of materials across a wide range of wavelengths, providing valuable insights into biological tissue composition, structure, and function. Applications in dermatology and skin research have been explored using various hardware configurations ranging from a derma scope to full face imaging. However, the adoption of HSI in internal clinical research has been limited due to operational complexities and low temporal resolution.

Alternatively, recovering spectral information from red-green-blue (RGB) values obtained from conventional trichromatic cameras can be challenging due to the loss of significant information when integrating hyperspectral radiance into RGB values.

A problem can therefore arise when attempting to apply conventional HIS and RBG approaches to identify causes of various skin conditions, issues, or concerns. This can lead to problems involving incorrect identification. Incorrect identification can, in turn, lead to ineffective treatment. For example, a product designed to treat one skin condition, issue, or concern can be incorrectly applied in the attempt to treat a different skin condition, issue, or concern, which, on the one hand, can at least be ineffective, and on the other hand can be potentially dangerous (e.g., application of a prescription medication that is different than what the medication is intended for).

These problems can be exacerbated given the complexity of skin types, especially when considered across different users, each of whom may be associated with different demographics, races, and/or ethnicities. This creates a problem in the diagnosis and treatment of various human skin conditions and characteristics. For example, prior art methods, including personal consumer product trials can be time consuming or error prone (and possibly negative). In addition, a user may attempt to empirically experiment with various products or techniques, but without achieving satisfactory results and/or causing possible negative side effects, impacting the health or otherwise visual appearance of his or her skin.

Still further, in order to acquire certain skin care products, a user may need to visit a skin care specialist, such as a dermatologist. But such an approach can be problematic, time consuming, and, perhaps, unavailable if a user is unable able to access such specialist outside of a given medical coverage plan. In addition, various conventional computer-related techniques are known for identify specific skin issues, but such conventional computer-related techniques fail to capture specific needs of a given user to address specific skin concerns in a manner similar to a user's in-person visit to a skin specialist, such as a dermatologist.

For the foregoing reasons, there is a need for AI-based systems and methods for generating and evaluating reconstructed multi-spectral images depicting skin, as described herein.

SUMMARY

Generally, as described herein, AI-based systems and methods for generating and evaluating reconstructed multi-spectral images depicting skin. Such AI-based systems and methods provide an imaging, and artificial intelligence, based solution for overcoming problems that arise from the difficulties in identifying and treating various endogenous and/or exogenous factors or attributes affecting the health of human skin.

The AI-based systems and methods comprise, among other things, generating reconstructed HS images for overcoming technical problems existing in current and future uses of skin products in clinical trials and/or commercial use of products related to skin care. The AI-based systems and methods improve skin optics by reconstruction of hyperspectral (HS) images allowing spectral light level analysis of skin to be performed based on standard digital images. This allows users access to skin care and personal care outside of, or as an augmented with, traditional clinical skin care treatment previously unavailable with digital imaging alone.

The digital imaging and artificial intelligence-based systems as described herein allow a user to submit a digital user image to imaging server(s) (e.g., including its one or more processors), or otherwise a computing device (e.g., such as locally on the user's mobile device), where the imaging server(s) or user computing device, implements or executes an artificial intelligence based AI model(s) trained with pixel data of potentially 10,000 s (or more) images depicting skin or skin areas of respective individuals. The AI model(s) may generate a reconstructed HS image of the user's skin. The reconstructed HS image may be inputted to additional AI models, which may generate output to address at least one feature (e.g., a skin condition such as a spot) identifiable within the pixel data comprising the at least the portion of a skin area of the user. For example, an image of the user's skin can comprise pixels or pixel data indicative of spots (e.g., hemoglobin, melanin related spots) or other skin attributes and/or skin conditions (e.g., acne, wrinkles, etc.) of a specific user's skin. In some embodiments, output, such as the HS image and/or identification of a given skin condition and/or ranking thereof, may be transmitted via a computer network to a user computing device of the user for rendering on a display screen. In other embodiments, no transmission to the imaging server of the user's specific image occurs, where the output may instead be generated by the AI model(s), executing and/or implemented locally on the user's mobile device and rendered, by a processor of the mobile device, on a display screen of the mobile device. In various embodiments, such rendering may include graphical representations, overlays, annotations, and the like for addressing the feature in the pixel data in reconstructed HS image.

More specifically, as described herein, in some aspects, the techniques described herein relate to an artificial intelligence (AI)-based system configured to generate and evaluate reconstructed multi-spectral images depicting skin, the AI-based system including: one or more processors; one or more memories communicatively coupled to the one or more processors; an application (app) stored in the one or more memories and including computing instructions configured to execute on the one or more processors; a hyper-spectral (HS) reconstruction model, accessible by the app, and trained with pixel data of a plurality of digital images depicting human skin, the HS reconstruction model configured to output one or more reconstructed HS images, wherein each HS image of the one or more reconstructed HS images includes a pixel-based image, and wherein each HS image of the one or more reconstructed HS images is emulated at one or more spectral bands; a skin attribute model, accessible by the app, and trained with skin attribute data and the one or more spectral bands, the skin attribute model configured to output one more skin attributes defining one or more effects of human skin when exposed to the one or more spectral bands; a skin mapping model, accessible by the app, and trained on the one or more reconstructed HS images as outputted by the HS reconstruction model, the skin mapping model configured to output mapping data including one or more of the following: pixel based data defining skin chromophore concentration and distribution, scattering map, collagen concentration and distribution, epidermal thickness, dermal thickness, an epidermal thickness map, a dermal thickness map, a hydration map, based on the one or more reconstructed HS images as input; a cosmetic attribute model, accessible by the app, and trained on the reconstructed HS images and the mapping data, the cosmetic attribute model configured to output one or more cosmetic attributes detectable within the reconstructed HS images based on the mapping data; and a population model, accessible by the app, and trained on a plurality of HS images of a selected population sample, wherein the population model is configured to output comparison data when provided with one or more of: the reconstructed HS images, the mapping data, and/or the one or more cosmetic attributes, wherein the computing instructions of the app when executed by the one or more processors, cause the one or more processors to: (a) receive one or more digital images of a user, the one or more digital images depicting pixel data of a skin area of the user, (b) input the one or more digital images into the HS reconstruction model, wherein the HS reconstruction model outputs one or more reconstructed HS images of the user, the one or more reconstructed HS images of the user having one or more corresponding spectral band values, (c) input the one or more corresponding spectral band values into the skin attribute model, wherein the skin attribute model outputs one more skin attributes of the user as determined when exposed to spectral bands defined by the one or more corresponding spectral band values, (d) input the one or more reconstructed HS images of the user into the skin mapping model, wherein the skin mapping model outputs mapping data of the user including one or more of the following: pixel based data defining skin chromophore concentration and distribution of the user, a scattering map for the user, collagen concentration and distribution, an epidermal thickness of the user, a dermal thickness of the user, an epidermal thickness map of the user, a dermal thickness map, and a hydration map, based on the one or more reconstructed HS images of the user, (e) input the one or more reconstructed HS images of the user and the mapping data of the user into the cosmetic attribute model, wherein the cosmetic attribute model outputs one or more cosmetic attributes of the user detectable within the reconstructed HS images based on the mapping data, (f) input the one or more reconstructed HS images of the user, the mapping data of the user, and the one or more cosmetic attributes of the user into the population model, wherein the population model outputs user-specific comparison data of the user comparing the skin area of the user to skin areas of the selected population sample, and (g) display, on a display screen, at least one of: user-specific comparison data of the user, the one or more reconstructed HS images of the user, or the mapping data of the user.

In some aspects, the techniques described herein relate to an artificial intelligence (AI)-based method for generating and evaluating reconstructed multi-spectral images depicting skin, the AI-based method including: (a) receiving, at an application (app) executing on one or more processors, one or more digital images of a user, the one or more digital images depicting pixel data of a skin area of the user; (b) inputting the one or more digital images into a hyper-spectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images includes a pixel-based image, and wherein each HS image of the one or more reconstructed HS images is emulated at one or more spectral bands; (c) inputting the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands; (d) inputting the one or more reconstructed HS images of the user into a skin mapping model, wherein the skin mapping model outputs mapping data of the user including one or more of the following: pixel based data defining skin chromophore concentration and distribution of the user, a scattering map for the user, collagen concentration and distribution of the user, an epidermal thickness of the user, a dermal thickness of the user, an epidermal thickness map of the user, a dermal thickness map of the user, and a hydration map, based on the one or more reconstructed HS images of the user, wherein the skin mapping model is accessible by the app and is trained on the one or more reconstructed HS images as outputted by the HS reconstruction model, and wherein the skin mapping model is configured to output mapping data including one or more of the following: pixel based data defining skin chromophore concentration and distribution, scattering map, collagen concentration and distribution, epidermal thickness, dermal thickness, an epidermal thickness map, a dermal thickness map, and a hydration map, based on the one or more reconstructed HS images as input; (e) inputting the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data; (f) inputting the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) displaying, on a display screen, at least one of: user-specific comparison data of the user, the one or more reconstructed HS images of the user, or the mapping data of the user.

In some aspects, the techniques described herein relate to a tangible, non-transitory computer-readable medium storing instructions for generating and evaluating reconstructed multi-spectral images depicting skin, that when executed by one or more processors cause the one or more processors to: (a) receive, at an application (app) executing on one or more processors, one or more digital images of a user, the one or more digital images depicting pixel data of a skin area of the user; (b) input the one or more digital images into a hyper-spectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images includes a pixel-based image, and wherein each HS image of the one or more reconstructed HS images is emulated at one or more spectral bands; (c) input the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands; (d) input the one or more reconstructed HS images of the user into a skin mapping model, wherein the skin mapping model outputs mapping data of the user including one or more of the following: pixel based data defining skin chromophore concentration and distribution of the user, a scattering map for the user, collagen concentration and distribution, an epidermal thickness of the user, dermal thickness of the user, an epidermal thickness map of the user, a dermal thickness map of the user, and a hydration map of the user, based on the one or more reconstructed HS images of the user, wherein the skin mapping model is accessible by the app and is trained on the one or more reconstructed HS images as outputted by the HS reconstruction model, and wherein the skin mapping model is configured to output mapping data including one or more of the following: pixel based data defining skin chromophore concentration and distribution, scattering map, collagen concentration and distribution, epidermal thickness, dermal thickness, an epidermal thickness map, a dermal thickness map, and a hydration map, based on the one or more reconstructed HS images as input; (e) input the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data; (f) input the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) display, on a display screen, at least one of: user-specific comparison data of the user, the one or more reconstructed HS images of the user, or the mapping data of the user.

In accordance with the above, and with the disclosure herein, the present disclosure includes improvements in computer functionality or in improvements to other technologies at least because the disclosure describes that, e.g., an imaging server, or otherwise computing device (e.g., a user computer device), is improved where the intelligence or predictive ability of the server or computing device is enhanced by a trained (e.g., machine learning trained) AI model(s). The AI model(s), executing on the imaging server or computing device, is able to more accurately identify, based on pixel data of various individuals, one or more of a user-specific skin conditions of the user's skin area, and/or a user-specific skin recommendation designed to address at least one feature identifiable within the pixel data comprising the at least the portion of a skin area of the user. That is, the present disclosure describes improvements in the functioning of the computer itself or "any other technology or technical field" because an imaging server or user computing device is enhanced with a plurality of training images (e.g., 10,000 s of training images and related pixel data as feature data) to accurately predict, detect, classify, or determine pixel data of a user-specific images, such as newly provided user images. This improves over the prior art at least because existing systems lack such predictive or classification functionality and are simply not capable of accurately analyzing user-specific images to output a predictive result to address at least one feature identifiable within the pixel data comprising the at least the portion of a skin area of the a given user.

For similar reasons, the present disclosure relates to improvements to other technologies or technical fields at least because the present disclosure describes or introduces improvements to computing devices in the skin care field and skin care products field, whereby the trained AI model(s) executing on the imaging device(s) or computing devices improves the field of skin care, chemical formulations and/or skin conditions and identification thereof, with digital and/or artificial intelligence based analysis of user or individual images to output a predictive result to address user-specific pixel data of at least one feature identifiable within the pixel data comprising the at least the portion of a skin area of a given user.

The present disclosure includes effecting a transformation or reduction of a particular article to a different state or thing, e.g., a transformation or reduction of a standard digital red-green-blue (RGB) image to a reconstructed hyper-spectral (HS) image, the latter of which may be used as input into the AI model(s) as described herein.

In addition, the present disclosure relates to improvement to other technologies or technical fields at least because the present disclosure describes or introduces improvements to computing devices in the skin care and/or skin care products field, whereby the trained AI model(s) executing on the imaging device(s) or computing device(s) improve the underlying computer device (e.g., imaging server(s) and/or user computing device), where such computer devices are made more efficient by the configuration, adjustment, or adaptation of a given machine-learning network architecture. For example, in some embodiments, fewer machine resources (e.g., processing cycles or memory storage) may be used by decreasing computational resources by decreasing machine-learning network architecture needed to analyze images, including by reducing depth, width, image size, or other machine-learning based dimensionality requirements. Such reduction frees up the computational resources of an underlying computing system, thereby making it more efficient.

Still further, the present disclosure relates to improvement to other technologies or technical fields at least because the present disclosure describes or introduces improvements to computing devices in the field of security, where images of users are preprocessed (e.g., cropped or otherwise modified) to define extracted or depicted skin areas of a user without depicting personal identifiable information (PII) of the user. For example, simple cropped or redacted portions of an image of a user may be used by the AI model(s) described herein, which eliminates the need of transmission of private photographs of users across a computer network (where such images may be susceptible of interception by third parties). Such features provide a security improvement, i.e., where the removal of PII (e.g., facial features) provides an improvement over prior systems because cropped or redacted images, especially ones that may be transmitted over a network (e.g., the Internet), are more secure without including PII information of a user. Accordingly, the systems and methods described herein operate without the need for such non-essential information, which provides an improvement, e.g., a security improvement, over prior system. In addition, the use of cropped images, at least in some embodiments, allows the underlying system to store and/or process smaller data size images, which results in a performance increase to the underlying system as a whole because the smaller data size images require less storage memory and/or processing resources to store, process, and/or otherwise manipulate by the underlying computer system.

In addition, the present disclosure includes applying certain of the claim elements with, or by use of, a particular machine, e.g., an imaging device, which captures images used to train the AI model(s) and used to determine an image classification corresponding to one or more features of a given user's skin area.

In addition, the present disclosure includes specific features other than what is well-understood, routine, conventional activity in the field, or adding unconventional steps that confine the claim to a particular useful application, e.g., AI-based systems and methods for generating and evaluating reconstructed multi-spectral images depicting skin.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
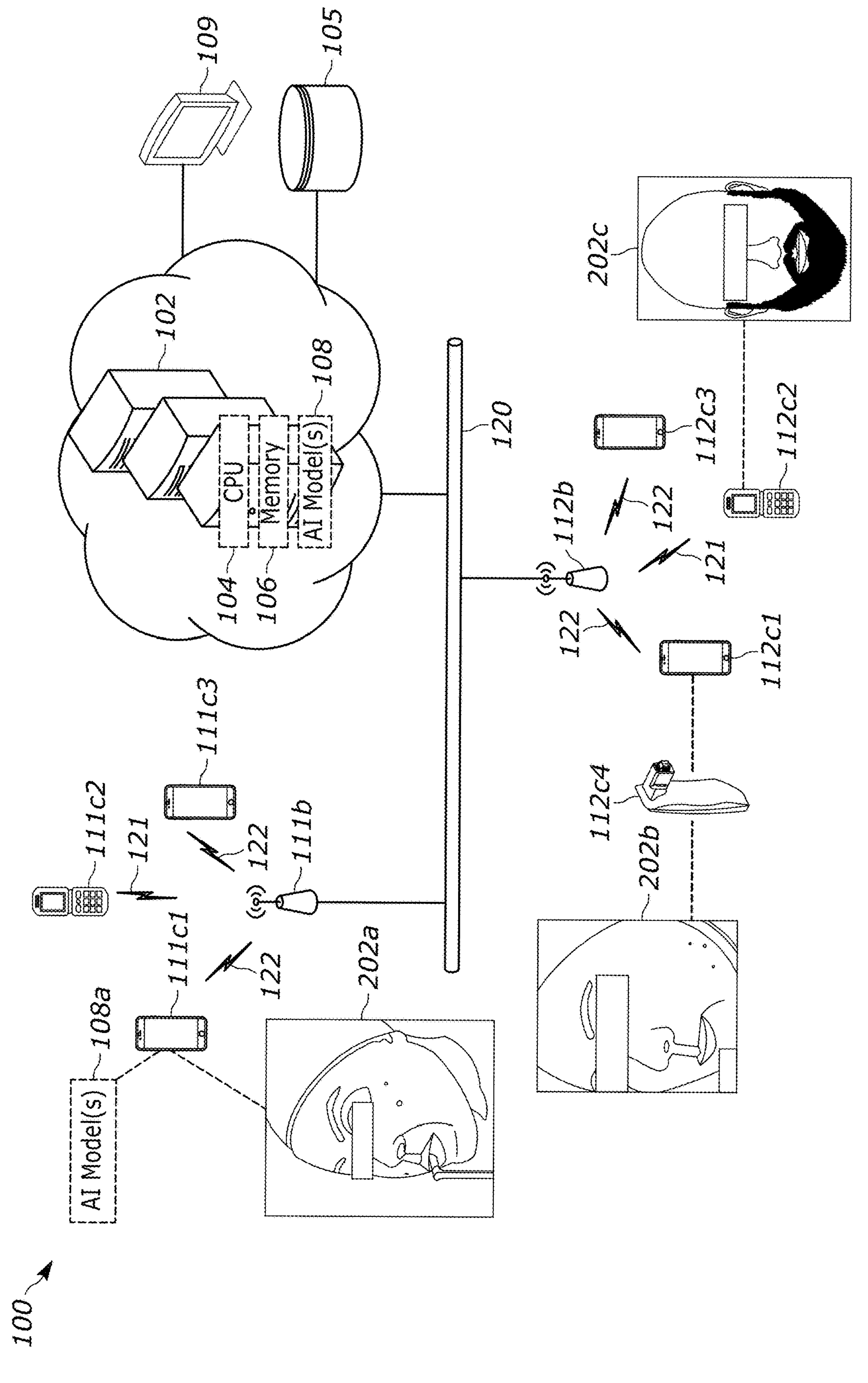
FIG. 1 illustrates an example AI-based system configured to generate and evaluate reconstructed hyper-spectral images depicting skin, in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

The disclosure herein provides a multiple artificial intelligence (AI) model based solution for generating and evaluating reconstructed multi-spectral images depicting skin, and which, by non-limiting example, may depict skin issue(s), skin concern(s), or otherwise skin conditions(s), including, but not limited to, e.g., pigmented spots, wrinkles and/or fine lines, acne, pores, sagging and/or loss of elasticity, uneven texture, skin thinning, dryness, oiliness, sensitivity, uneven skin tone, eczema, and/or dermatitis. In response, the multiple AI model-based solution can provide output that can be used for overcoming skin conditions specific to the user. For example, such output can include generation or otherwise determination of a user-specific recommendation and/or recommendation of a skin product with efficacy for therapeutically and/or dermatologically treating a predicted user-specific skin ailment and/or otherwise skin condition.

As an example, a user may have a specific skin concern. The user may provide one or more digital images as captured from a digital camera to the AI-based systems and methods. As used herein, a digital image refers to an RGB image having RGB pixel data. The AI-based systems and methods can then detect a specific skin condition from one or more reconstructed HS images. In one example, the HS images may depict a skin condition comprising acne. Acne generally occurs when pores become clogged with oil and dead skin cells. Acne may cause skin issues or conditions such as whiteheads, blackheads, or pimples. Such skin conditions may be treated by products including ingredients such as tretinoin, adapalene, and benzoyl peroxide. In this way, through the provision of digital images (which may be captured by a user's mobile device), the user can cause the AI-based systems and methods to generate reconstructed HS images, where the AI-based systems and methods can identify, based on the reconstructed HS images, recommended acne skin care product(s) for treating acne.

As a still further example, the user may provide digital images depicting wrinkles, which can be caused by natural aging and/or environmental factors such as sun exposure, pollutants, smoking, etc. Wrinkles can refer to skin having a high amount of skin laxity. Wrinkles can be treated with products that include ingredients such as glycolic acid, retinol, vitamin C, and/or hyaluronic acid. In this way, through the provision of digital images (which may be captured by a user's mobile device), the user can cause the AI-based systems and methods to generate reconstructed HS images, where the AI-based systems and methods can identify, based on the reconstructed HS images, recommended wrinkle-related skin care product having the related active ingredients for treating wrinkles.

A still further example, the user may provide digital images depicting pigmented spots (e.g., hemoglobin and/or melanin). Such spots may, in some cases, be effectively treated with a combination of hydroxycinnamic acids (HCAs) and niacinamide at a low pH can, which can decrease the melanin and hemoglobin in persistent spots or marks. Through the provision of digital images (which may be captured by a user's mobile device), the user can cause the AI-based systems and methods to generate reconstructed HS images, where the AI-based systems and methods can identify, based on the reconstructed HS images, recommended a pigment treating skin care product having the related active ingredients for treating skin pigments or spots (e.g., hemoglobin and/or melanin).

It is to be understood that additional, and/or different, skin concerns and/or related products having active ingredients for treating the skin concern may be identified and recommended, respectively. Such recommendations may be based on depictions and/or classifications of specific skin conditions within reconstructed HS image(s). Generally, as referred to herein, one or more skin condition classifications may comprise one or more of an acne classification, a spot classification, or other such classification corresponding to skin condition as described herein. For example, a spot classification may comprise a determination as to whether a spot, as depicted in a HS image, comprise a hemoglobin type classification or a melanin type classification. It is to be understood, however, that additional and/or different types of skin conditions, types, and/or classifications may also be analyzed, identified, and/or classified in accordance with the systems and methods herein.

Once a given skin concern or otherwise skin condition is identified from one or more reconstructed HS images of the user and other data or output from one or more AI models as described herein, then the disclosed AI-based systems and methods can then determine which product could treat the skin concern. In some aspects, one or more images may be generated, or one or more existing images can be augmented or updated, to depict how the specific skin concern is predicted to appear after applying the recommending product. The user would then be able to determine whether to purchase the product for real-world applications for treating his or her skin.

Additional details are provided by disclosure herein, which describes AI-based systems and methods for prediction, identification and/or classification of such skin conditions, issues, or concerns, which allows effective treatment, such as product and/or composition recommendation, selection, and use.

FIG. 1 illustrates an example AI-based system 100 configured to generate and evaluate reconstructed multi-spectral images depicting skin, in accordance with various embodiments disclosed herein. In the example embodiment of FIG. 1, AI-based system 100 includes server(s) 102, which may comprise one or more computer servers. In various embodiments server(s) 102 comprise multiple servers, which may comprise multiple, redundant, or replicated servers as part of a server farm. In still further embodiments, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server(s) 102 may include one or more processor(s) 104 (i.e., CPU(s)) as well as one or more computer memories 106. In various embodiments, server(s) 102 may be referred to herein as "imaging server(s)."

Memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 106 may store an operating system (OS) (e.g., Microsoft Windows, Linux, UNIX, etc.) capable of facilitating the functionalities, apps, methods, or other software as discussed herein. Memorie(s) 106 may also store one or more AI model(s) 108, each of which may comprise an artificial intelligence-based model, such as a hyper-spectral (HS) reconstruction machine learning model, trained on various images (e.g., images 202*a*, 202*b*, and/or 202*c*), as described herein. Additionally, or alternatively, the AI model(s) 108 may also be stored in database 105, which is accessible or otherwise communicatively coupled to imaging server(s) 102. AI model(s) 108 may comprise any of the AI models described herein including, but not limited to, a hyper-spectral (HS) reconstruction model, a skin attribute model, a skin mapping model, a cosmetic attribute model, a population model, and/or a simulation model.

In addition, memories 106 may also store machine readable instructions, including any of one or more application(s) (e.g., an imaging application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging-based machine learning model or component, which may include the HS machine model or other models as describe herein, each as stored or accessed as AI model(s) 108, where each may be configured to facilitate their various functionalities discussed herein. It should be appreciated that one or more other applications may be envisioned and that are executed the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine-readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 104 (e.g., a relational database, such as Oracle, DB2, MySQL, or a NoSQL based database, such as MongoDB). The data stored in memories 106 and/or database 105 may include all or part of any of the data or information described herein, including, for example, training images and/or user images (e.g., including any one or more of images 202*a*, 202*b*, and/or 202*c*; zoomed, cropped, and/or segmentation related images (e.g., 202*ac*1 and/or 202*ac*2); and/or other images and/or information of the user, including demographic, age, race, skin type, or the like, or as otherwise described herein.

Imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various embodiments, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to terminal 109. According to some embodiments, an administrator or operator may access server 102 via terminal 109 to review information, make changes, input training data or images, initiate training of AI model(s) 108, and/or perform other functions.

As described herein, in some embodiments, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111*c*1-111*c*3 and/or 112*c*1-112*c*4 via base stations 111*b* and 112*b*. In some embodiments, base stations 111*b* and 112*b* may comprise cellular base stations, such as cell towers, communicating to the one or more user computing devices 111*c*1-111*c*3 and 112*c*1-112*c*4 via wireless communications 121 based on any one or more of various mobile phone standards, including NMT, GSM, CDMA, UMMTS, LTE, 5G, or the like. Additionally, or alternatively, base stations 111*b* and 112*b* may comprise routers, wireless switches, or other such wireless connection points communicating to the one or more user computing devices 111*c*1-111*c*3 and 112*c*1-112*c*4 via wireless communications 122 based on any one or more of various wireless standards, including by non-limiting example, IEEE 802.11a/b/c/g (WIFI), the BLUETOOTH standard, or the like.

Any of the one or more user computing devices 111*c*1-111*c*3 and/or 112*c*1-112*c*4 may comprise mobile devices and/or client devices for accessing and/or communications with imaging server(s) 102. Such mobile devices may comprise one or more mobile processor(s) and/or an imaging device for capturing images, such as images as described herein (e.g., any one or more of images 202*a*, 202*b*, and/or 202*c*). In various embodiments, user computing devices 111*c*1-111*c*3 and/or 112*c*1-112*c*3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or table.

In additional embodiments, the user computing device 112*c*4 may be a portable microscope device such as a dermascope that a user may use to capture detailed images of the user's skin. Specifically, the portable microscope device 112*c*4 may include a microscopic camera that is configured to capture images (e.g., any one or more of images 202*a*, 202*b*, and/or 202*c*) at an approximately microscopic level of a skin area of a user's skin. For example, unlike any of the user computing devices 111*c*1-111*c*3 and 112*c*1-112*c*3, the portable microscope device 112*c*4 may capture detailed, high-magnification (e.g., 2 megapixels for 60-200 times magnification) images of the user's skin while maintaining physical contact with the user's skin. As a particular example, the portable microscope device 112*c*4 may be the API 100 SKIN ANALYSIS device, developed by NERA SOLUTIONS LTD. In certain embodiments, the portable microscope device 112*c*4 may also include a display or user interface configured to display the captured images and/or the results of the image analysis to the user.

Additionally, or alternatively, the portable microscope device 112*c*4 may be communicatively coupled to a user computing device 112*c*1 (e.g., a user's mobile phone) via a WIFI connection, a BLUETOOTH connection, and/or any other suitable wireless connection, and the portable microscope device 112*c*4 may be compatible with a variety of operating platforms (e.g., Windows, iOS, Android, etc.). Thus, the portable microscope device 112*c*4 may transmit the captured images to the user computing device 112*c*1 for analysis and/or display to the user. Moreover, the portable microscope device 112*c*4 may be configured to capture high-quality video of a user's skin and may stream the high-quality video of the user's skin to a display of the portable microscope device 112*c*4 and/or a communicatively coupled user computing device 112*c*1 (e.g., a user's mobile phone). In certain additional embodiments, the components of each of the portable microscope device 112*c*4 and the communicatively connected user computing device 112*c*1 may be incorporated into a singular device.

In additional embodiments, user computing devices 111*c*1-111*c*3 and/or 112*c*1-112*c*3 may comprise a retail computing device. A retail computing device may comprise a user computer device configured in a same or similar manner as a mobile device, e.g., as described herein for user computing devices 111*c*1-111*c*3, including having a processor and memory, for implementing, or communicating with (e.g., via server(s) 102), an AI model(s) 108 as described herein. Additionally, or alternatively, a retail computing device may be located, installed, or otherwise positioned within a retail environment to allow users and/or customers of the retail environment to utilize the digital imaging and artificial intelligence-based systems and methods on site within the retail environment. For example, the retail computing device may be installed within a kiosk for access by a user. The user may then upload or transfer images (e.g., from a user mobile device) to the kiosk to implement the digital imaging and artificial intelligence-based systems and methods described herein. Additionally, or alternatively, the kiosk may be configured with a camera to allow the user to take new images (e.g., in a private manner where warranted) of himself or herself for upload and transfer. In such embodiments, the user or consumer himself or herself would be able to use the retail computing device to receive and/or have rendered a user-specific electronic spot classification, as described herein, on a display screen of the retail computing device.

Additionally, or alternatively, the retail computing device may be a mobile device (as described herein) as carried by an employee or other personnel of the retail environment for interacting with users or consumers on site. In such embodiments, a user or consumer may be able to interact with an employee or otherwise personnel of the retail environment, via the retail computing device (e.g., by transferring images from a mobile device of the user to the retail computing device or by capturing new images by a camera of the retail computing device), to receive and/or have rendered a user-specific electronic skin classification, as described herein, on a display screen of the retail computing device. In various embodiments, the one or more user computing devices 111*c*1-111*c*3 and/or 112*c*1-112*c*4 may implement or execute an operating system (OS) or mobile platform such as Apple's iOS and/or Google's Android operation system. Any of the one or more user computing devices 111*c*1-111*c*3 and/or 112*c*1-112*c*4 may comprise one or more processors and/or one or more memories for storing, implementing, or executing computing instructions or code, e.g., a mobile application or a home or personal assistant application, as described in various embodiments herein. As shown in FIG. 1, AI model(s) 108*a* and/or an imaging application as described herein, or at least portions thereof, may also be stored locally on a memory of a user computing device (e.g., user computing device 111*c*1). In some aspects, AI model(s) 108*a* as installed on a computing device may comprise the same AI model(s) 108 as installed on server(s) 102. Additionally, or alternatively, AI model(s) 108*a* may comprise a portion of AI model(s) 108 as installed on server(s) 102. It is to be understood that in some aspects, AI model(s) may be installed wholly at user computing device, wholly at server(s) 102, or partially on user computing device and partially on server(s) 102 where communication between AI model(s) 108*a* and AI model(s) 108 occurs through computer network 120. Generally, when AI model(s) is referred to herein, it refers to one or both of AI model(s) 108 and/or AI model(s) 108*a*. T User computing devices 111*c*1-111*c*3 and/or 112*c*1-112*c*4 may comprise a wireless transceiver to receive and transmit wireless communications 121 and/or 122 to and from base stations 111*b* and/or 112*b*. In various embodiments, pixel-based images (e.g., images 202*a*, 202*b*, and/or 202*c*) may be transmitted via computer network 120 to imaging server(s) 102 for training of learning model(s) (e.g., AI model(s) 108) and/or imaging analysis as described herein.

In addition, the one or more user computing devices 111*c*1-111*c*3 and/or 112*c*1-112*c*4 may include an imaging device and/or digital video camera for capturing or taking digital images and/or frames (e.g., which can be any one or more of images 202*a*, 202*b*, and/or 202*c*). Each digital image may comprise pixel data for training or implementing model(s), such as AI or machine learning models, as described herein. For example, an imaging device and/or digital video camera of, e.g., any of user computing devices 111*c*1-111*c*3 and/or 112*c*1-112*c*4, may be configured to take, capture, or otherwise generate digital images (e.g., pixel-based images 202*a*, 202*b*, and/or 202*c*) and, at least in some embodiments, may store such images in a memory of a respective user computing devices. Additionally, or alternatively, such digital images may also be transmitted to and/or stored on memorie(s) 106 and/or database 105 of server(s) 102.

Still further, each of the one or more user computer devices 111*c*1-111*c*3 and/or 112*c*1-112*c*4 may include a display screen for displaying graphics, images, text, spot classifications, skin products, data, pixels, features, and/or other such visualizations or information as described herein. In various embodiments, graphics, images, text, spot classifications, skin products, data, pixels, features, and/or other such visualizations or information may be received from imaging server(s) 102 for display on the display screen of any one or more of user computer devices 111*c*1-111*c*3 and/or 112*c*1-112*c*4. Additionally, or alternatively, a user computer device, e.g., as described herein for FIG. 6, may comprise, implement, have access to, render, or otherwise expose, at least in part, an interface or a guided user interface (GUI) for displaying text and/or images on its display screen.

In some embodiments, computing instructions and/or applications executing at the server (e.g., server(s) 102) and/or at a mobile device (e.g., mobile device 111*c*1) may be communicatively connected for display and/or analyzing pixel data of an image of user skin, as described herein. For example, one or more processors (e.g., processor(s) 104) of server(s) 102 may be communicatively coupled to a mobile device via a computer network (e.g., computer network 120). In such embodiments, an imaging app may comprise a server app portion configured to execute on the one or more processors of the server (e.g., server(s) 102) and a mobile app portion configured to execute on one or more processors of the mobile device (e.g., any of one or more user computing devices 111*c*1-111*c*3 and/or 112*c*1-112*c*3) and/or standalone imaging device (e.g., user computing device 112*c*4). In such embodiments, the server app portion is configured to communicate with the mobile app portion. The server app portion or the mobile app portion may each be configured to implement, or partially implement, one or more of: (a) receiving one or more digital images of a user, the one or more digital images depicting pixel data of a skin area of the user, (b) inputting the one or more digital images into the HS reconstruction model, wherein the HS reconstruction model outputs one or more reconstructed HS images of the user, the one or more reconstructed HS images of the user having one or more corresponding spectral band values, (c) inputting the one or more corresponding spectral band values into the skin attribute model, wherein the skin attribute model outputs one more skin attributes of the user as determined when exposed to spectral bands defined by the one or more corresponding spectral band values, (d) inputting the one or more reconstructed HS images of the user into the skin mapping model, wherein the skin mapping model outputs mapping data of the user comprising one or more of the following: pixel based data defining skin chromophore concentration and distribution of the user, a scattering map for the user, a collagen concentration and distribution, an epidermal thickness of the user, a dermal thickness of the user, an epidermal thickness map of the user, a dermal thickness map of the user, and a hydration map, based on the one or more reconstructed HS images of the user, (e) inputting the one or more reconstructed HS images of the user and the mapping data of the user into the cosmetic attribute model, wherein the cosmetic attribute model outputs one or more cosmetic attributes of the user detectable within the reconstructed HS images based on the mapping data, (f) inputting the one or more reconstructed HS images of the user, the mapping data of the user, and the one or more cosmetic attributes of the user into the population model, wherein the population model outputs user-specific comparison data of the user comparing the skin area of the user to skin areas of the selected population sample, and/or (g) displaying, on a display screen, at least one of: user-specific comparison data of the user, the one or more reconstructed HS images of the user, or the mapping data of the user.

Figure 2:
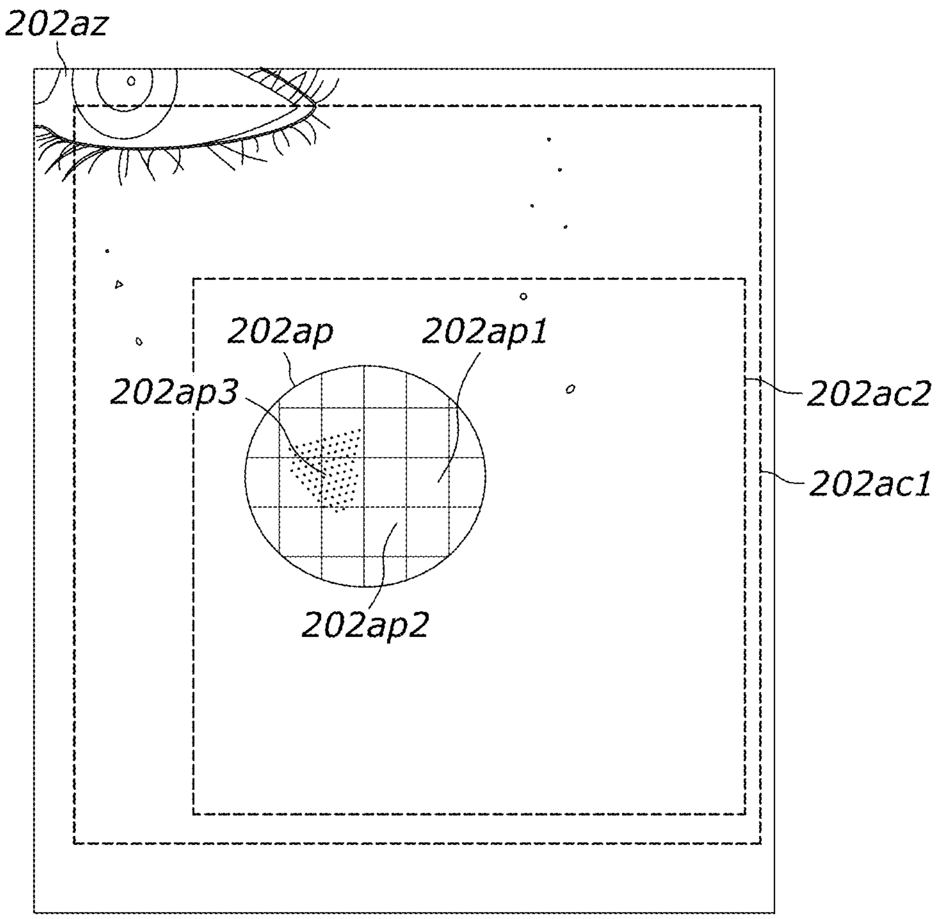
FIG. 2 illustrates an example image and its related pixel data that may be used for training and/or implementing an AI based models, including, for example, a hyper-spectral (HS) reconstruction model, in accordance with various embodiments disclosed herein.

FIG. 2 illustrates an example image 202*az* and its related pixel data that may be used for training and/or implementing an AI based models, including, for example, a hyper-spectral (HS) reconstruction model, in accordance with various embodiments disclosed herein. In various embodiments, as shown for FIG. 2, image 202*az* may be an image captured by a user. In the embodiment, image 202*az* represents and is depicted as a zoomed or cropped version of image 202*a* of FIG. 1. Image 202*az* (as well as images 202*a*, 202*b* and/or 202*c*) may be transmitted to server(s) 102 via computer network 120, as shown for FIG. 1. It is to be understood that such images may be captured by the users themselves or, additionally or alternatively, others, such as a retailer, etc., where such images are used and/or transmitted on behalf of a user.

More generally, digital images, such as example images 202*a*, 202*b*, and 202*c*, may be collected or aggregated at imaging server(s) 102 and may be analyzed by, and/or used to train, either directly or indirectly, AI model(s) (e.g., an AI model such as a machine learning imaging model as described herein). Each of these images may comprise pixel data comprising feature data depicting human skin and/or corresponding to skin areas of respective users, within the respective image. The pixel data may be captured by an imaging device of one of the user computing devices (e.g., one or more user computer devices 111*c*1-111*c*3 and/or 112*c*1-112*c*4).

With respect to digital images as described herein, pixel data (e.g., pixel data 202*ap* of FIG. 2) comprises individual points or squares of data within an image, where each point or square represents a single pixel (e.g., each of pixel 202*ap*1, pixel 202*ap*2, and pixel 202*ap*3) within an image. Each pixel may be at a specific location within an image. In addition, each pixel may have a specific color (or lack thereof). Pixel color, may be determined by a color format and related channel data associated with a given pixel. For example, a popular color format is a 1976 CIELAB (also referenced herein as the "CIE L*-a*-b*" or simply "L*a*b*" color format) color format that is configured to mimic the human perception of color. Namely, the L*a*b* color format is designed such that the amount of numerical change in the three values representing the L*a*b* color format (e.g., L*, a*, and b*) corresponds roughly to the same amount of visually perceived change by a human. This color format is advantageous, for example, because the L*a*b* gamut (e.g., the complete subset of colors included as part of the color format) includes both the gamuts of Red (R), Green (G), and Blue (B) (collectively RGB) and Cyan (C), Magenta (M), Yellow (Y), and Black (K) (collectively CMYK) color formats.

In the L* a* b* color format, color is viewed as point in three-dimensional space, as defined by the three-dimensional coordinate system (L*, a*, b*), where each of the L* data, the a* data, and the b* data may correspond to individual color channels, and may therefore be referenced as channel data. In this three-dimensional coordinate system, the L* axis describes the brightness (luminance) of the color with values from 0 (black) to 100 (white). The a* axis describes the green or red ratio of a color with positive a* values (+a*) indicating red hue and negative a* values (−a*) indicating green hue. The b* axis describes the blue or yellow ratio of a color with positive b* values (+b*) indicating yellow hue and negative b* values (−b*) indicating blue hue. Generally, the values corresponding to the a* and b* axes may be unbounded, such that the a* and b* axes may include any suitable numerical values to express the axis boundaries. However, the a* and b* axes may typically include lower and upper boundaries that range from approximately 150 to −150. Thus, in this manner, each pixel color value may be represented as a three-tuple of the L*, a*, and b* values to create a final color for a given pixel. As another example, a popular color format includes the red-green-blue (RGB) format having red, green, and blue channels. That is, in the RGB format, data of a pixel is represented by three numerical RGB components (Red, Green, Blue), that may be referred to as channel data, to manipulate the color of pixel's area within the image. In some implementations, the three RGB components may be represented as three 8-bit numbers for each pixel. Three 8-bit bytes (one byte for each RGB value) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24-bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges.

As a whole, the various pixels, positioned together in a grid pattern (e.g., pixel data 202*ap*), form a digital image or portion thereof. A single digital image can comprise thousands or millions of pixels. Images can be captured, generated, stored, and/or transmitted in a number of formats, such as JPEG, TIFF, PNG and GIF. These formats use pixels to store or represent the image.

With reference to FIG. 2, example image 202*az* illustrates a skin area of a user or individual. More specifically, image 202*az* comprises pixel data, including pixel data 202*ap* defining the skin area of the user's or individual's skin. Pixel data 202*ap* includes a plurality of pixels including pixel 202*ap*1, pixel 202*ap*2, and pixel 202*ap*3. In example image 202*a*, each of pixel 202*ap*1, pixel 202*ap*2, and pixel 202*ap*3 are representative of features of skin corresponding to image classifications of a skin area. In the example of FIG. 2, features of the skin or otherwise skin area of a user may comprise one or more of spots related to hemoglobin and/or spots related to melanin. It is to be understood, however that features could correspond to additional and/or different skin conditions, such as acne, wrinkles, or other skin conditions as described herein.

Further, each of these features, as shown for FIG. 2, may be determined from or otherwise based on one or more pixels in a digital image (e.g., image 202*az*). For example, with respect to image 202*az*, each of pixels 202*ap*1 and 202*ap*2 may be relatively light pixels (e.g., pixels with relatively high L* values) and/or relatively yellow pixels (e.g., pixels with relatively high or positive b* values) positioned within pixel data 202*ap* in a region of the user's skin, which may be indicative of regular or more common values of the user's skin. Pixel 202*ap*3 however, may comprise darker pixels (e.g., with negative or lower relative *L values) and/or redder pixels (e.g., positive or higher relative a* values), which may be indicative of skin conditions of a users's skin, including by way of non-limiting example, any of a melanin or hemoglobin related spot, acne, wrinkle(s), or other skin conditions, at that location in the image of the user's skin. Such pixel features may be used to train AI model(s) (e.g., AI model(s) 108). For example, in various aspects, such pixel features may be used to train an HS reconstruction model that is configured to output one or more reconstructed HS images, e.g., as described herein for FIG. 4.

In addition to pixels 202*ap*1, 202*ap*2, and 202*ap*3, pixel data 202*ap* includes various other pixels including remaining portions of the user's skin, including various other skin areas and/or portions of skin that may be analyzed and/or used for training of model(s), and/or analysis by used of already trained models, such as AI model(s) 108 as described herein. For example, pixel data 202*ap* further includes pixels representative of features, which may comprise additional skin conditions (e.g., spots), and, in various aspects, in addition to the skin conditions, the grouping of such pixels at a particular location in the image, where such pixels having similar L*a*b* and/or RGB values, provides training information for spot classification as described herein.

A digital image, such as a training image, an image as submitted by users, or otherwise a digital image (e.g., any of images 202*a*, 202*b*, and/or 202*c*), may be or may comprise a cropped image. Generally, a cropped image is an image with one or more pixels removed, deleted, or hidden from an originally captured image. In some aspects, each image of the one or more of the plurality of training images e.g., any of images 202*a*, 202*b*, and/or 202*c*) or the image of the user comprises at least one cropped image depicting the skin area having a single instance of a skin condition feature. For example, with reference to FIG. 2, image 202*az* represents at least a portion of an original image. Cropped portion 202*ac*1 represents a first cropped portion of image 202*az* that removes portions of the user's skin (outside of cropped portion 202*ac*1) that may not include readily identifiable skin condition features. As a further example, cropped portion 202*ac*2 represents a second cropped portion of image 202*az* that removes portions of the image (outside of cropped portion 202*ac*2) that may not include spot features that are as readily identifiable as the features included in the cropped portion 202*ac*2, and may therefore be less useful as training data. In various embodiments, analyzing and/or use of cropped images for training yields improved accuracy of AI model(s). It also improves the efficiency and performance of the underlying computer system in that such system processes, stores, and/or transfers smaller size digital images. Still further, images may be sent as cropped or that otherwise include extracted or depicted skin areas of a user without depicting personal identifiable information (PII) of the user. Such cropped images provide a security improvement, i.e., where the removal of PII provides an improvement over prior systems because cropped or redacted images, especially ones that may be transmitted over a network (e.g., the Internet), are more secure without including PII information of a user. Importantly, the systems and methods described herein may operate without the need for such non-essential information, which provides an improvement, e.g., a security and a performance improvement, over conventional systems. Moreover, while FIG. 2 may depict and describe a cropped image, it is to be understood, however, that other image types including, but not limited to, original, non-cropped images (e.g., original image 202*a*) and/or other types/sizes of cropped images (e.g., cropped portion 202*ac*1 of image 202*az*) may be used or substituted as well.

It is to be understood that the disclosure for image 202*az* of FIG. 2 applies the same or similarly for other digital images described herein, including, for example, images 202*a*, 202*b*, and/or 202*c*, where such images also comprise pixels that may be analyzed and/or used for training of model(s) as described herein.

In addition, digital images of a user's skin, as described herein, may depict various skin features, which may be used to train AI model(s) across a variety of different users having a variety of different skin features. For example, as illustrated for images 202*a*, 202*b*, and 202*c*, the skin areas of these users comprise skin features (e.g., spots) of the user's skin areas identifiable with the pixel data of the respective images. These skin features include, for example, features indicative of hemoglobin, melanin, acne, wrinkles, which can comprise discrete skin areas or features (e.g., spots or skin depressions or darkened areas) at one or more locations distributed across the user's skin.

In various embodiments, digital images (e.g., images 202*a*, 202*b*, and 202*c*), whether used as training images depicting individuals, or used as images depicting users or individuals for analysis and/or spot classification, may comprise multiple angles or perspectives depicting skin of each of the respective individual or the user. That is, each image of the one or more of the plurality of training images or the image of a user may comprise multiple angles or perspectives depicting skin areas of the respective individuals or the user. The multiple angles or perspectives may include different views, positions, closeness of the user and/or backgrounds, lighting conditions, or otherwise environments in which the user is positioned against in a given image. For example, FIG. 1 includes skin images (e.g., 202*a*, 202*b*, and 202*c*) that depict skin areas of respective individuals and/or users and are captured using different lighting conditions (e.g., visible, UV) at different angles. Such images may be used for training a AI model(s), or for analysis, and/or user-specific spot classifications, as described herein.

Figure 3A:
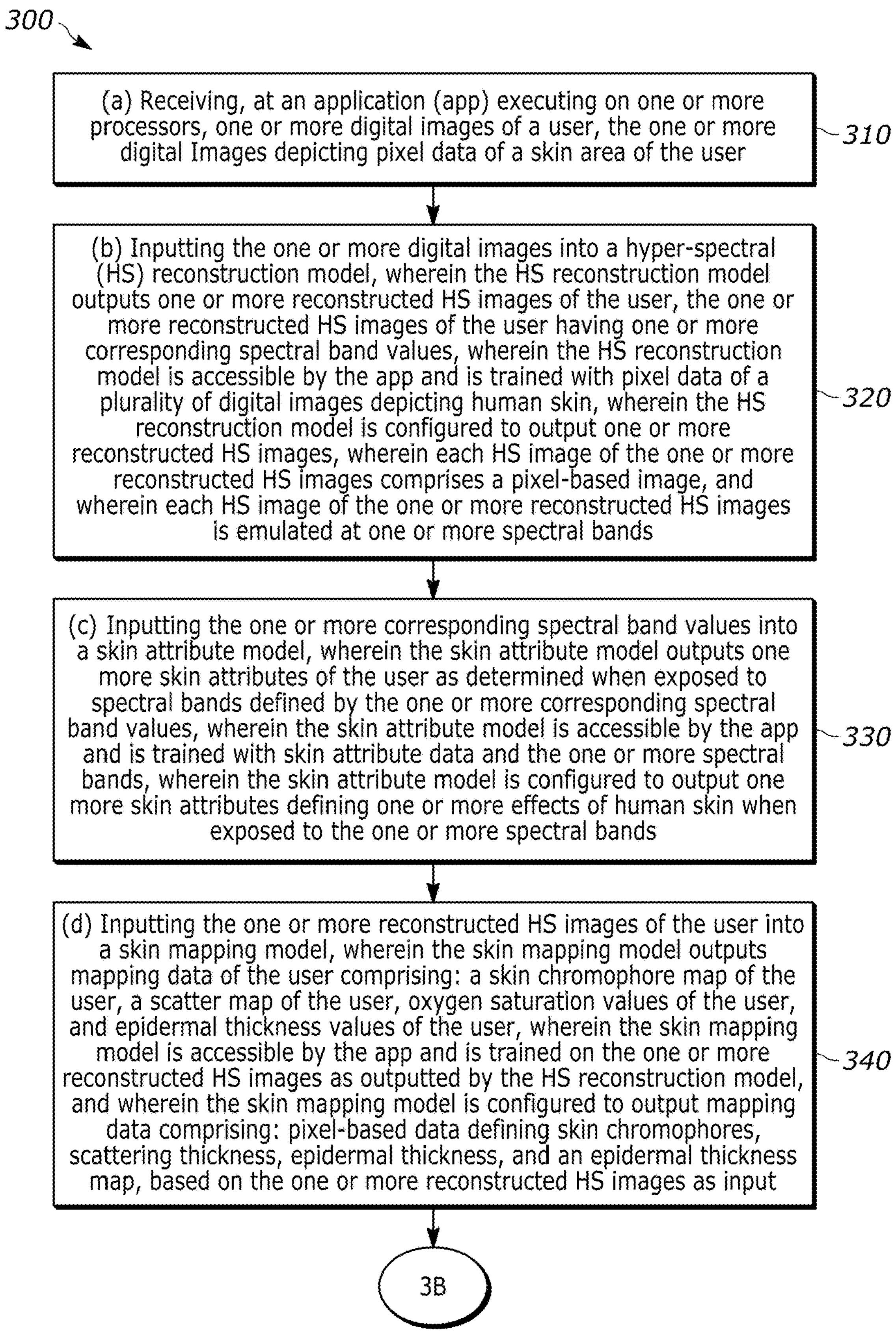
FIGS. 3A & B illustrate an example AI-based method for generating and evaluating reconstructed hyper-spectral images depicting skin, in accordance with various embodiments disclosed herein.
Figure 3B:
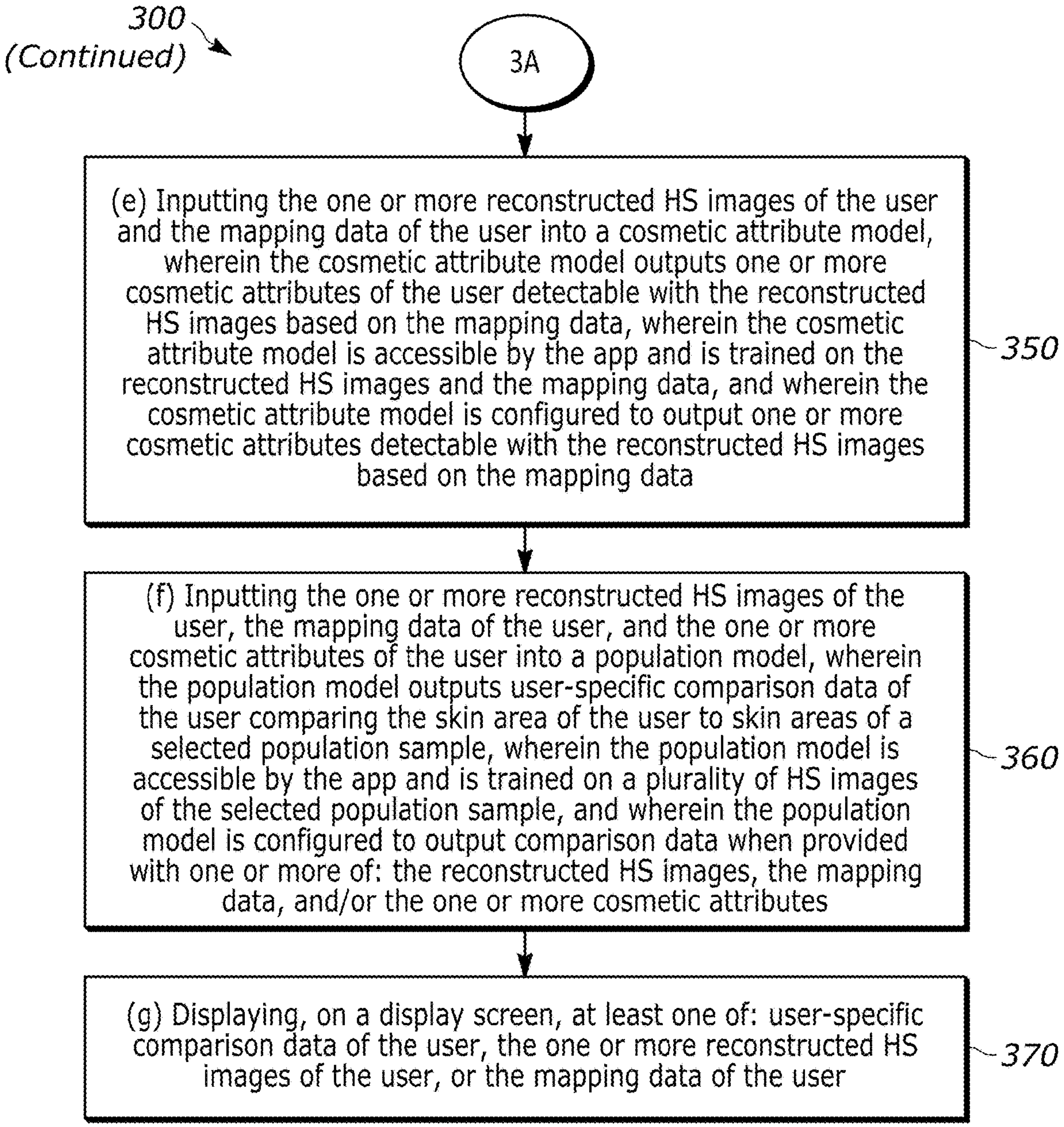

FIG. 3 illustrates an example AI-based method 300 for generating and evaluating reconstructed multi-spectral images depicting skin, in accordance with various embodiments disclosed herein. At block 310, AI-based method 300 comprises receiving, at an application (app) executing on one or more processors, one or more digital images of a user. The one or more images may comprise a digital image(s) (e.g., any of images 202*a*, 202*az*, 202*b*, and/or 202*c*) as captured by an imaging device (e.g., a digital camera of the mobile device 111*c*1). Further, each of the one or more digital images may depict pixel data of a skin area of the user. In various aspects, the one or more processors may comprise processor(s) 104 of server(s) 102. Additionally, or alternatively, the one or more processors may comprise a processor of a mobile device (e.g., computing device 111*c*1). Images, as used with method 300, and more generally as described herein, are pixel-based images as captured by an imaging device (e.g., an imaging device of user computing device 111*c*1). In some embodiments an image may comprise or refer to a plurality of images such as a plurality of images (e.g., frames) as collected using a digital video camera. Frames comprise consecutive images defining motion, and can comprise a movie, a video, or the like.

At block 320, AI-based method 300 further comprises inputting the one or more digital images into a HS reconstruction model. The one or more digital images may comprise pixel data (e.g., RGB data). Such images may include still images and/or video images (e.g., video frames) as captured by professional and/or consumer cameras.

After receiving the images as input, the HS reconstruction model outputs one or more reconstructed HS images of the user. The reconstructed HS images may comprise new or otherwise generated images that simulate, recreate, reconstruct, or otherwise appear to be HS images, but are not captured by a HS sensor or camera, and instead are output by the HS reconstruction model based on digital images, e.g., having RGB pixel data. In this way the HS reconstruction model allows the AI-system to have and use HS image quality, but foregoes the need to actually capture HS images with a HS sensor or camera, e.g., in a controlled environment. In some aspects, the HS reconstruction model comprises a deep learning model, for example, as described herein for FIG. 4 or elsewhere herein.

In various aspects, the one or more reconstructed HS images of the user have one or more corresponding spectral band values. Generally, spectral bands refer to specific ranges of wavelengths within the electromagnetic spectrum that are captured and measured by remote sensing instruments or imaging systems. Each spectral band corresponds to a distinct interval of wavelengths (e.g., spectral band values), typically expressed in nanometers (nm) or micrometers (μm) and is sensitive to particular characteristics of the reflected or emitted radiation from objects or surfaces. Spectral band values may comprise, by way of non-limiting example, spectral bands and/or HS images taken or generated (e.g. via HS reconstruction model) at wavelengths of any one or more 420 nm, 430 nm, 450 nm, 470 nm, 560 nm, 580 nm, 680 nm, and/or 700 nm, for example, as shown by way of non-limiting example in FIGS. 5A-5E herein. It is to be understood, however, that additional and/or different wavelengths may also be used spectral band value(s).

In various aspects, the HS reconstruction model is accessible by the app. In various aspects, the HS reconstruction model is accessible by the app, where the app may access the model to provide input and output. The HS reconstruction model is trained with pixel data of a plurality of digital images depicting human skin. The digital images may comprise digital images 202*a*, 202*b*, and/or 202*c*, e.g., which may have been captured by a digital or otherwise RGB pixel-based camera. The HS reconstruction model is configured to output one or more reconstructed HS images, e.g., simulated HS images. Each HS image of the one or more reconstructed HS images may comprise a pixel-based image and may be emulated at one or more spectral bands. For example, each pixel in a reconstructed HS image may have or be assigned a unique signature based on its reflectance values across one or more multiple spectral bands. In some aspects, the HS reconstruction model may output the one or more reconstructed HS images in real-time or near real-time. Such output may occur via a user computing device such as a mobile phone and/or at a server that transmits its output to a user computing device.

With further reference to FIG. 3, at block 330, AI-based method 300 further comprises inputting the one or more corresponding spectral band values into a skin attribute model. The skin attribute model comprises an AI model that outputs one more skin attributes of the user as determined when exposed to spectral bands defined by the one or more corresponding spectral band values (e.g., 420 nms-700 nms). In various aspects, the skin attribute model is accessible by the app, where the app may access the model to provide input and output. The skin attribute model is trained with skin attribute data and the one or more spectral bands. Skin attribute data may comprise one or more attributes specific to skin, including, but not limited to, texture, color, elasticity, smoothness, thickness, skin condition(s), and/or other skin related data or features as described herein. The skin attribute model is configured to output one more skin attributes defining one or more effects of human skin when exposed to the one or more spectral bands. In various aspects, the skin attribute model may comprise a statistical model, a machine learning model, or a deep learning model.

In various aspects the skin attribute model (e.g., one of the AI models of AI model(s) 108) is an artificial intelligence (AI) based model trained with at least one AI algorithm. Generally, training of any one of the AI model(s) 108 involves analysis of the training data to configure weights of each of the AI model(s) 108, and its underlying algorithm (e.g., machine learning or artificial intelligence algorithm) used to predict and/or classify additional data as input into a trained model. For example, in various embodiments herein, generation of an AI model (e.g., one of the AI model(s) 108) involves training the AI model(s) 108 with the of training data (e.g., images) of a plurality of individuals, where the training data may comprise data regarding skin attributes identified within skin areas of respective individuals, or other data as described herein. In some embodiments, one or more processors of a server or a cloud-based computing platform (e.g., imaging server(s) 102) may receive the training data (e.g., images) of the plurality of individuals via a computer network (e.g., computer network 120). In such embodiments, the server and/or the cloud-based computing platform may train the AI model(s) with the data (e.g., images) of the plurality of individuals. Additionally, in some aspects, AI model(s) may be further trained with user demographic data (e.g., data indicating race, skin color, etc.) and environment data (e.g., amount of sunshine, geography, weather conditions, etc.) of the respective users. In such aspects, predictions and/or classifications), as generated by the AI model(s), may be further based on user demographic data and environment data as provided by a given user.

In various embodiments, a machine learning imaging model, as described herein (e.g., any one of the AI model(s) 108), may be trained using a supervised or unsupervised machine learning program or algorithm. The machine learning program or algorithm may employ a neural network, which may be a convolutional neural network (CNN), recurrent neural network (RNN), generative adversarial network (GAN), Transformer, Diffusion, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning model(s), such as the AI model(s) described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

With respect to the skin attribute model, machine learning may involve identifying and recognizing patterns in existing data (such as identifying features of skin, such as spot, color, discoloration, and/or patterns of related features, within skin attribute data and/or one or more spectral bands, or as otherwise described herein) in order to facilitate making predictions or identification for subsequent data, such as using the model on newly inputted data (e.g., new skin attribute data and/or one or more spectral bands) in order to determine or generate one more skin attributes defining one or more effects of human skin when exposed to the one or more spectral bands.

With further reference to FIG. 3, at block 340, AI-based method 300 further comprises inputting the one or more reconstructed HS images of the user into a skin mapping model, wherein the skin mapping model outputs mapping data of the user comprising one or more of the following: pixel based data defining skin chromophore concentration and distribution of the user, a scattering map for the user, collagen concentration and distribution of the user, an epidermal thickness of the user, a dermal thickness of the user, an epidermal thickness map of the user, a dermal thickness map of the user, and a hydration map of the user, based on the one or more reconstructed HS images of the user. In various aspects, the skin mapping model is accessible by the app, where the app may access the model to provide input and output. The skin mapping model is trained with the one or more reconstructed HS images as outputted by the HS reconstruction model. Each of the reconstructed HS images may comprise HS pixel values at various spectral bands (e.g., as described herein for FIGS. 5A-5E or elsewhere herein), wherein each of the pixel and/or one or more patterns of pixels, may define or depict skin attributes of a given user.

Based on the one or more reconstructed HS images as input, the skin mapping model is configured to output mapping data comprising one or more of the following: pixel based data defining skin chromophore concentration and distribution, scattering map, collagen concentration and distribution, epidermal thickness, dermal thickness, an epidermal thickness map, a dermal thickness map, and a hydration map. The mapping data may comprise pixel-based data (e.g., pixel data of the reconstructed HS images) of skin chromophores that can be used to enhance the HS images with chromophore related data can affect pixel values based on light, or otherwise spectral wavebands, as emitted by chromophores. Chromophores are molecules that absorb light at a particular wavelength and emits color as a result, and the pixel data of a reconstructed HS image can define a given chromophore. An epidermal thickness map may define the thickness of skin (epidermis) as various portions within a reconstructed HS image. A dermal thickness map may define the thickness of the dermis as various portions within a reconstructed HS image. Collagen fibers in the dermal layer can scatter incident light, which impacts on the pixel data in reconstructed HS images. Pixel data of a reconstructed HS image can define collagen fiber. Water absorbs light at distinct wavelength and the pixel data of a reconstructed HS image can define water content of skin.

Chromophores, scattering, epidermal thickness values (e.g., as defined by the epidermal thickness map), and dermal thickness values (e.g., as defined by the dermal thickness map) may be used to construct or generate, with skin mapping model, pixel-based images and/or image overlays of chromophores (e.g., oxy-hemoglobin, deoxy-hemoglobin, oxygen saturation, eumelanin, pheomelanin, bilirubin). Such images or image overlays may be applied or added to reconstructed HS images as output by the HS reconstruction model and/or skin mapping model in order to graphically enhance or otherwise augment such images to depict or otherwise illustrate realistic effects of HS images as caused by the reflection of light across the various spectral wavelengths as caused by chromophores, the skin chromophore concentration and/or distributions data, the scattering map defining the scattering of spectral wavelength(s) distributes through the epidermis, and/or epidermis thickness.

In various aspects, the skin attribute model comprises a statistical model, a machine learning model, or a deep learning model. For example, With respect to the skin mapping model, machine learning may involve identifying and recognizing patterns in existing data (such as identifying features of skin, such as spot, color, discoloration, and/or patterns of related features, within pixel data of the reconstructed HS images, or as otherwise described herein) in order to facilitate output predictions or identification for subsequent data, such as using the model on newly inputted images (e.g., new reconstructed HS images) in order to determine or generate pixel based data (e.g., new HS image pixel based data) defining skin chromophore concentration and distribution, scattering map, collagen concentration and distribution, epidermal thickness, dermal thickness, an epidermal thickness map, a dermal thickness map and/or image overlays of chromophores, which may be used to create a reconstructed and/or otherwise new HS image, e.g., via graphical overlays or graphical enhancements to reconstructed HS images as output by the HS reconstruction model.

With further reference to FIG. 3, at block 350, AI-based method 300 further comprises inputting the one or more reconstructed HS images of the user and the mapping data of the user into a cosmetic attribute model. The cosmetic attribute model outputs one or more cosmetic attributes (e.g., wrinkles, skin colorations or other skin conditions and/or skin features) of the user detectable within the reconstructed HS images based on the mapping data. In various aspects, the cosmetic attribute model is accessible by the app, where the app may access the model to provide input and output. The cosmetic attribute model is trained with the reconstructed HS images and the mapping data. The cosmetic attribute model is configured to output one or more cosmetic attributes detectable within the reconstructed HS images based on the mapping data.

In various aspects, the cosmetic attribute model comprises a statistical model, a machine learning model, or a deep learning model. For example, cosmetic attribute model may comprise a machine learning model, wherein machine learning may involve identifying and recognizing patterns in existing data (such as identifying features of skin, such as spot, color, discoloration, and/or patterns of related features, within the reconstructed HS images and the mapping data, or as otherwise described herein) in order to facilitate making predictions or identification for subsequent data, such as using the model on newly inputted data (e.g., reconstructed HS images and the mapping data) in order to determine or detect cosmetic attributes identifiable within the reconstructed HS images based on the mapping data. For example, the mapping data may be used to identify where skin conditions may exist within the reconstructed HS images, allowing the model to learn and identifying where skin conditions occur or are otherwise detectable within the features of the reconstructed HS images.

With further reference to FIG. 3, at block 360, AI-based method 300 further comprises inputting the one or more reconstructed HS images of the user, the mapping data of the user, and the one or more cosmetic attributes of the user into a population model, wherein the population model outputs user-specific comparison data of the user comparing the skin area of the user to skin areas of a selected population sample. In some aspects, the plurality of HS images of the selected population sample upon which the population model is trained comprises a population data set defining a plurality of skin areas, a plurality of skin tones, a plurality of ages, and/or a plurality of phenotypes. The selected population sample may correspond to the population data set upon which the population model is trained.

In various aspects, the population model is accessible by the app, where the app may access the model to provide input and output. The population model is trained with a plurality of HS images of the selected population sample. The HS images may be HS images as captured by a HS sensor and/or camera. Additionally, or alternatively, the HS images may comprise reconstructed HS images, such as those described herein. The population model is configured to output comparison data when provided with, and/or based on, one or more of: the reconstructed HS images, the mapping data, and/or the one or more cosmetic attributes.

In various aspects, the population model may comprise a statistical model, a machine learning model, or a deep learning model. For example, the population model may comprise a machine learning model trained to identify and recognize patterns in existing data (such as identifying comparison features of skin, such as spot, color, discoloration, and/or patterns of related features of different persons identifiable having different demographics identifiable within the pixel data of the HS images of a selected population sample, or as otherwise described herein) in order to facilitate making predictions or identification for subsequent data such as using the model on newly inputted data (e.g., new HS images of a selected population sample) in order to determine or generate comparison data relating to comparisons of population and/or demographic features of persons identified within the reconstructed HS images, the mapping data, and/or the one or more cosmetic attributes.

Additionally, or alternatively, one or more features of skin or skin areas may differ based on one or more user demographics and/or ethnicities of the respective individuals represented in respective training images used to train the population model, and/or other AI models described herein. The one or more features of skin or skin areas may be those typically associated with, or otherwise naturally occurring for, different races, genomes, and/or geographic locations associated with such demographics and/or ethnicities. For example, the weights of the model may be trained via analysis of various L*a*b* values of individual pixels of a training image. For example, dark or low L* values (e.g., a pixel with an L* value less than 50) may indicate regions of an image of a user with darker skin and/or where hemoglobin and/or melanin is present. Likewise, a slightly lighter L* values (e.g., a pixel with an L* value greater than 50) may indicate a person with lighter skin and/or the absence of melanin or hemoglobin. Still further, high/low a* values may indicate areas of the skin containing more/less melanin and/or hemoglobin. Together, when a pixel having skin toned L*a*b* values is positioned within a given image, or is otherwise surrounded by, a group or set of pixels having melanin and/or hemoglobin toned colors, then AI model(s) (e.g., AI model(s) 108) can determine an image or otherwise spot classification of a user's skin area and related spots, as identified within the given image. In this way, pixel data (e.g., detailing skin areas of skin of respective individuals) of 10,000 s training images may be used to train or use a machine learning imaging model to determine an image classification of the user's skin area, and various skin types (e.g., light or dark) and/or spot classifications thereof.

With further reference to FIG. 3, at block 370, AI-based method 300 further comprises displaying, on a display screen, at least one of: user-specific comparison data of the user, the one or more reconstructed HS images of the user, or the mapping data of the user. In some aspects, the user-specific comparison data of the user, the one or more reconstructed HS images of the user, and/or the mapping data of the user can be displayed on the display screen in real-time or near real-time.

In some aspects a simulation model may be implemented, deployed, or otherwise used to augment or otherwise update reconstructed HS images of a user to show how skin conditions, skin features, skin appearance, or otherwise skin data is predicted to change when treated or otherwise subjected to with active ingredients. For example, a simulation model may comprise a machine learning model configured to output a simulated image comprising at least one of: (a) a simulated reconstructed HS image; (b) a simulated digital image (e.g., an RGB image or a constructed RGB image from reconstructed HS image); and/or (c) a reconstructed digital image based on a reconstructed HS image. The simulated image depicts a simulated area of the user's skin as predicted to appear after treatment of at least one of one or more skin care compositions. In various aspects, the simulation model is accessible by the app, where the app may access the model to provide input and output. The simulation model is trained with one or more outputs of the HS reconstruction model and data defining the one or more skin care compositions, each of the one or more skin care compositions comprising one or more active ingredients known to treat the one or more cosmetic attributes. The active ingredients may comprise niacinamide, hydroxycinnamic acids (HCAs), and other such skin active ingredients at respective preferred ranges. The active ingredients may be those found in skin care products, where such skin care products may comprise a composition, such as a cream, with HCAs and niacinamide at a low pH, which can decrease the melanin and hemoglobin in persistent spots or marks. Other such active ingredients and related skin care products for treating additional and/or different skin conditions are contemplated, too.

The simulation model is configured to input at least one HS image of a user of the one or more reconstructed HS images of the user in order to provide or generate the simulation image of the user depicting the original input HS image of the user as predicted to appear once treated with the active ingredients.

In various aspects, simulation model may comprise a machine learning for identifying and recognizing patterns in existing data (such as identifying features of skin, such as spot, color, discoloration, and/or patterns of related features, within pixel data and/or based on spectral band values of an HS image of users provided as training data to the simulation model, or as otherwise described herein) in order to facilitate making predictions or identification for subsequent data, such as using the model on newly inputted data (e.g., an HS image of a user) in order to determine or generate one or more skin care compositions each comprising one or more active ingredients known to treat the one or more cosmetic attributes specific to the user.

In various aspects, the simulated image may be displayed on a display screen. In still further aspects, a user-specific product recommendation for a manufactured product comprising a skin care composition selected from the one or more skin care compositions may be output, e.g., for display to the user. For example, the user-specific product recommendation may be displayed on the display screen with instructions for treating, with the manufactured product, at least one feature identifiable in pixel data comprising a skin area of the user. Still further, in some aspects, computing instructions of the app when executed by the one or more processors, may cause the one or more processors to initiate, based on the user-specific product recommendation, the manufactured product for shipment to the user.

Figure 4A:
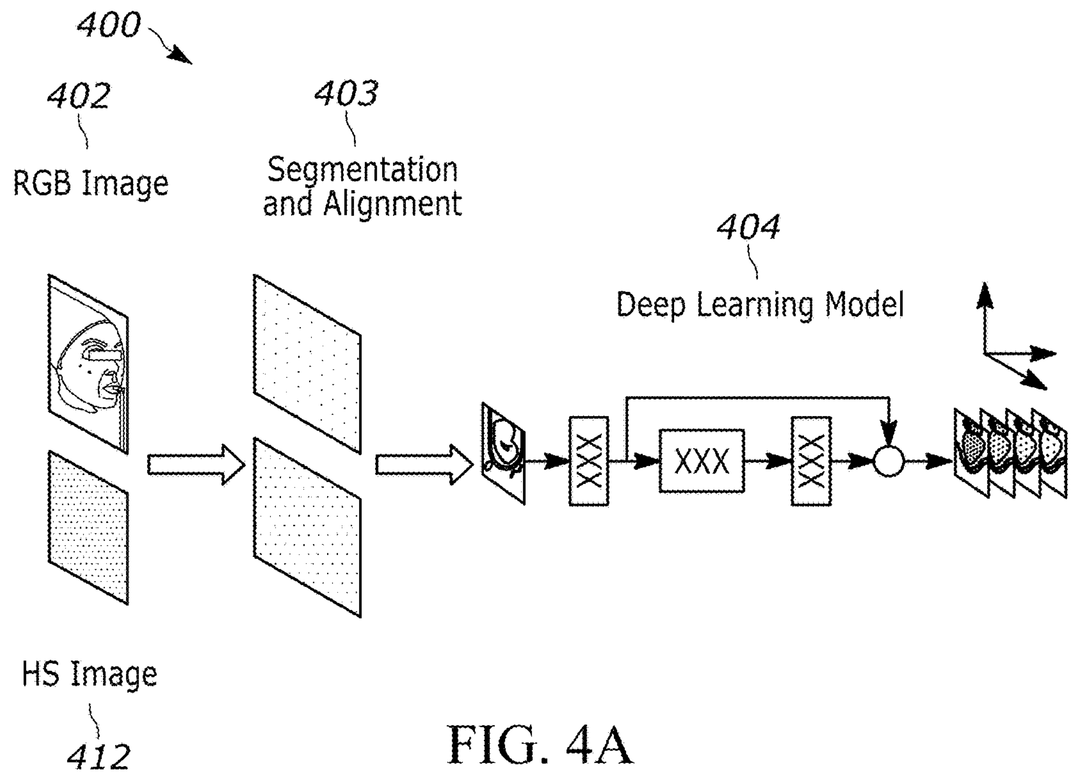
FIG. 4A illustrates an example method for training an HS reconstruction model, in accordance with various embodiments disclosed herein.

FIG. 4A illustrates an example method 400 for training an HS reconstruction model, in accordance with various embodiments disclosed herein. In the example of FIG. 4, HS reconstruction model comprises a deep learning model. Generally, deep learning is a subset of machine learning that utilizes neural networks with many layers to model and understand complex patterns in data. It involves the use of algorithms known as artificial neural networks. These networks consist of multiple layers of interconnected nodes (i.e., neurons), where each layer processes the input data, extracts increasingly nuanced features, and passes this transformed data to the next layer. In the example of FIG. 4, the deep learning model may comprise a convolution neural network (CNN), a recurrent neural network (RNN), a vision transformer, a generative adversarial network (GAN), a diffusion model, and/or a distillation model.

As shown for FIG. 4, an RGB image 402 is paired with a corresponding HS image 412. The two images may comprise a training pair of data depicting a same view of a user, the RBG image having RGB feature data as captured with a digital camera and the HS image having HS data as captured with an HS sensor or camera. The same view of the user may be captured when a digital camera and HS sensor or camera are positioned to capture a same view and/or nearly same view such that the area of the user's skin as captured by each of the digital camera and HS sensor is the same or nearly the same. In this way, the deep learning model (e.g., the HS reconstruction model) is trained with one or more sets of skin image pairs, wherein each skin image pair of the one or more sets of skin image pairs comprises: (1) a digital image of a skin of a user; and (e.g., RGB image 402), and (2) a hyperspectral image of the skin of the user (e.g., HS image 412). In various aspects, the digital image (e.g., RGB image 402) and the hyperspectral image user (e.g., HS image 412) may comprise one or more of: (a) images depicting one or more skin areas of the user; (b) images depicting one or more types of skin tones, ages, and/or phenotypes.

At stage 403, segmentation and alignment of the RGB image 402 and the HS image 412 is implemented. Segmentation may comprise identifying skin areas within each of the images. Alignment may comprise lining up or matching the images such that features (e.g., skin conditions such as spots) from one image overlaps or otherwise has the same or similar x-y values as the other image. In this way, the images can provide a mapping of digital pixel values to HS pixel values (e.g., based on spectral wavelengths) on an x-y coordinate plane. Libraries such as Mediapipe can be used to align images.

In some aspects, additional image calibration may also be implemented, include cropping or zooming an original image to remove extraneous features, and thus reduce file size. For example, as shown for FIG. 2, image 202*az* is a cropped or zoomed variant of image 202*a*, where image 202*az* can be obtained by application of image calibration, which is then used as RGB image 402. HS image 412 can be calibrated in a same or similar manner.

At stage 404, a transformer is applied to the segmented and aligned images (e.g., segmented and aligned RGB image 402 and the HS image 412). In the example of FIG. 4, a multi-stage spectral-wise transformer (e.g., MST++) is applied segmented and aligned images (e.g., segmented and aligned RGB image 402 and the HS image 412). Implementing the multi-stage spectral-wise transformer comprising determining basic units of a given image, i.e., Spectral-wise Attention Blocks. The SABs build up Single-stage Spectral-wise Transformer (SST) to extract multi-resolution contextual information. MST++, cascaded by several SSTs, progressively improves the reconstruction quality from coarse quality to fine quality images. In this way, the MST++ transformer can take an RGB image as input and reconstruct and output an HSI counterpart image. As shown for FIG. 4A, the model (e.g., e.g., HS reconstruction model) may be trained segmented and aligned RGB (predictor) and HS (target) images as training data, e.g., RGB image 402 and the HS image 412 as training pairs, respectively.

Figure 4B:
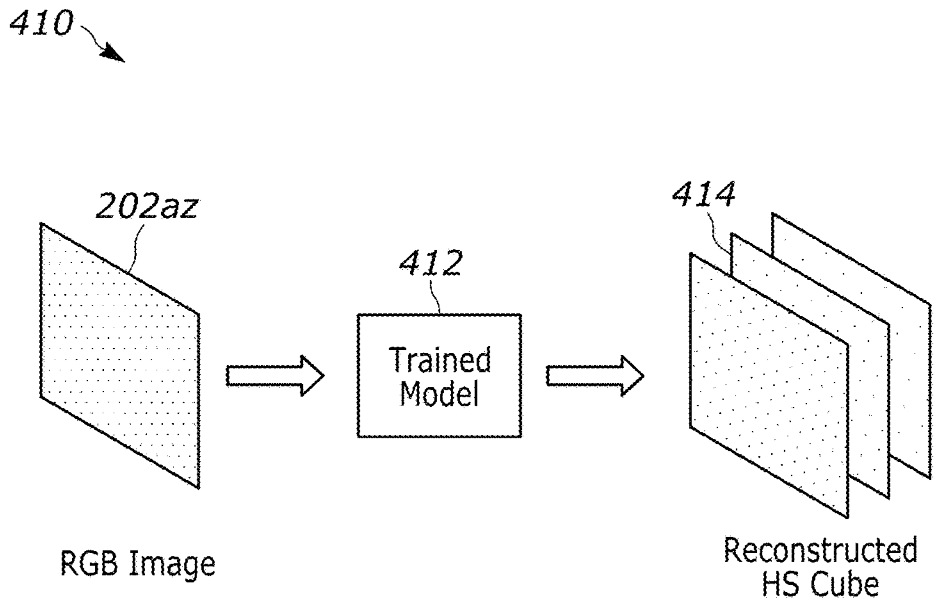
FIG. 4B illustrates an example method for implementing the HS reconstruction model of FIG. 4A, in accordance with various embodiments disclosed herein.

FIG. 4B illustrates an example method for implementing the HS reconstruction model of FIG. 4A, in accordance with various embodiments disclosed herein. In FIG. 4B, HS reconstruction model 412 is a trained model as trained with imaging pairs, such as RGB image 402 as paired with a corresponding HS image 412. As shown for FIG. 4B, HS reconstruction model 412 takes as input a digital image (e.g., an RGB image), such as image 202*az*, as input, and outputs a reconstructed HS image 414. In the example of FIG. 4B, HS image 414 comprises a reconstructed HS image cube, which is a data structure or otherwise multiple image structure comprising HS images a various spectral bands. In some aspects, the trained model (e.g., HS reconstruction model 412) can reconstruct HS images (420-700 nm) when skin RGB images as provided as input. The model can reconstruct a 2000×3000 pixel image in a few seconds on H100/A6000 graphic processing units (GPU)s.

In this way, as shown for FIGS. 4A and 4B, HSI images can be reconstructed (simulated) by the HS reconstruction model based on RGB images as taken by a standard RGB camera. Once trained, the HS reconstruction model (e.g., HS reconstruction model 412) is configured to output HSI images based RGB images as input. The reconstructed HS images enable the claimed systems and methods to provide images for skin analysis, skin visualization, and skin care/personal care applications as described herein.

Figure 5A:
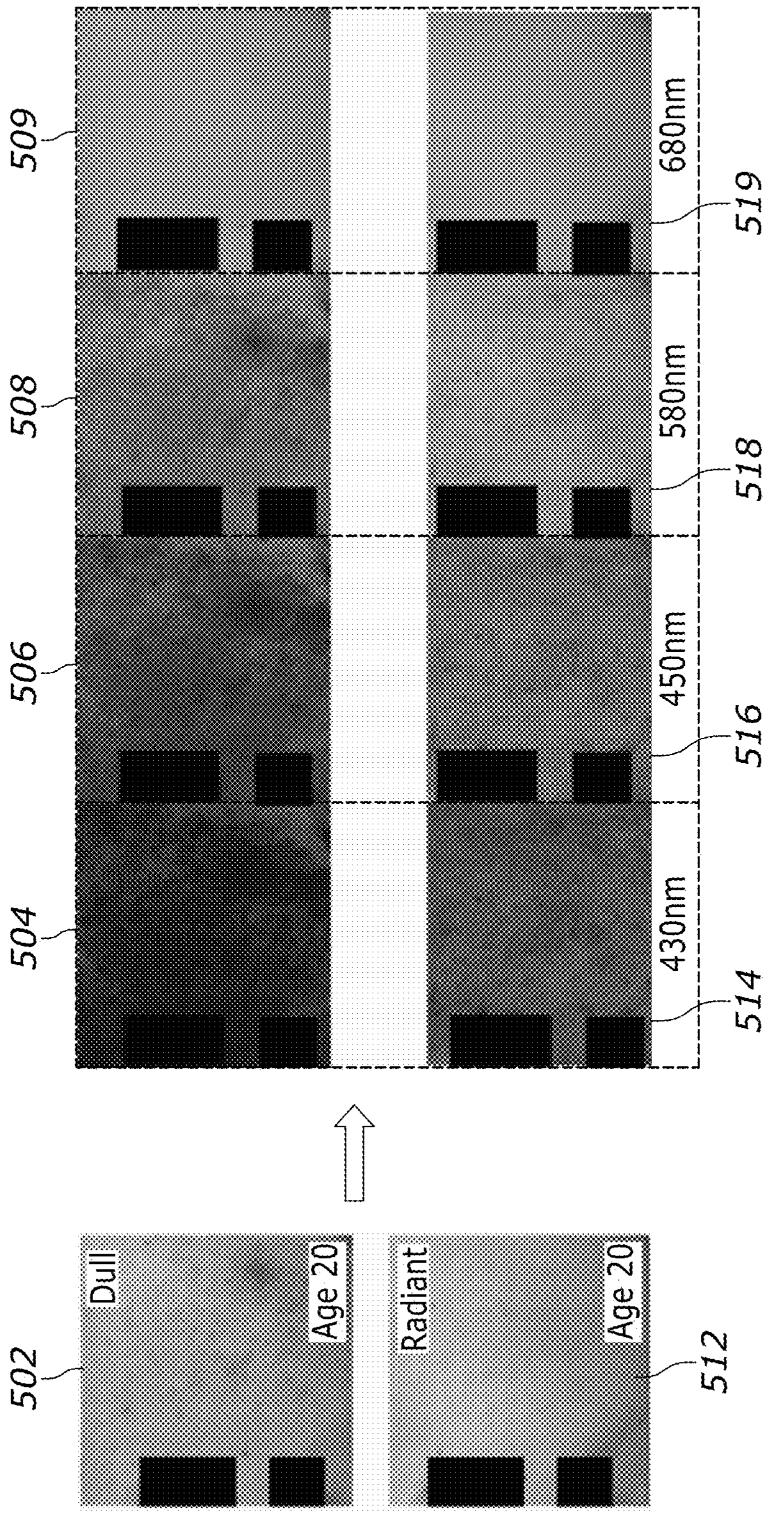
FIG. 5A illustrates example RGBs images with corresponding HS images at various wavelengths and depicting example users having different skin types, e.g., a radiant type and dull skin type, in accordance with various embodiments disclosed herein.

FIG. 5A illustrates example RGBs images (e.g., RBG images 502 and 512) with corresponding HS images (e.g., HS images 504, 506, 508, 509, 514, 516, 518, and 519) at various wavelengths (e.g., 430 nm, 450 nm, 580 nm, and 680 nm) and depicting example users having different skin types, e.g., a radiant type and dull skin type, in accordance with various embodiments disclosed herein. As shown, RGB image 502 is a digital image of a user (e.g., of a certain age; age 20) having a dull skin type, which may be determined from data provided and/or from luminescence values, *LaB values, RGB values, or otherwise pixel features of RGB image 502. RGB image 502 is associated with several HS images 504, 506, 508, 509, which were generated or captured at different spectral wavelengths and, thus, are associated with different spectral wavelength band values (e.g., 430 nm, 450 nm, 580 nm, and 680 nm, respectively). The HS images may be those captured by an HS sensor or camera and/or be generated images, e.g., reconstructed HS images as described herein.

Similarly, as shown, RGB image 512 is a digital image of a second user (e.g., of a certain age; age 20) having a radiant skin type, which may be determined from data provided and/or from luminescence values, *LaB values, RGB values, or otherwise pixel features of RGB image 512. RGB image 512 is associated with several HS images 514, 516, 518, 519, which were generated or captured at different spectral wavelengths and, thus, are associated with different spectral wavelength band values (e.g., 430 nm, 450 nm, 580 nm, and 680 nm, respectively). The HS images may be those captured by an HS sensor or camera and/or be generated images, e.g., reconstructed HS images as described herein.

Each of the RGB image 502 and the RGB image 512 may represent training data, input data, and/or output of one or more of the AI models (e.g., HS reconstruction model) as described herein. Similarly, each of the HS images 504, 506, 508, 509, 514, 516, 518, and 519 may represent training data, input data, and/or output of one or more of the AI models (e.g., HS reconstruction model) as described herein.

Use of the images of different skin types, which may represent skin types of different demographics, allow the AI models to be trained on distinct differences at various wavelengths across a variety of users, which allows the systems and methods herein to provide non-invasive skin diagnosis or otherwise output.

Figure 5B:
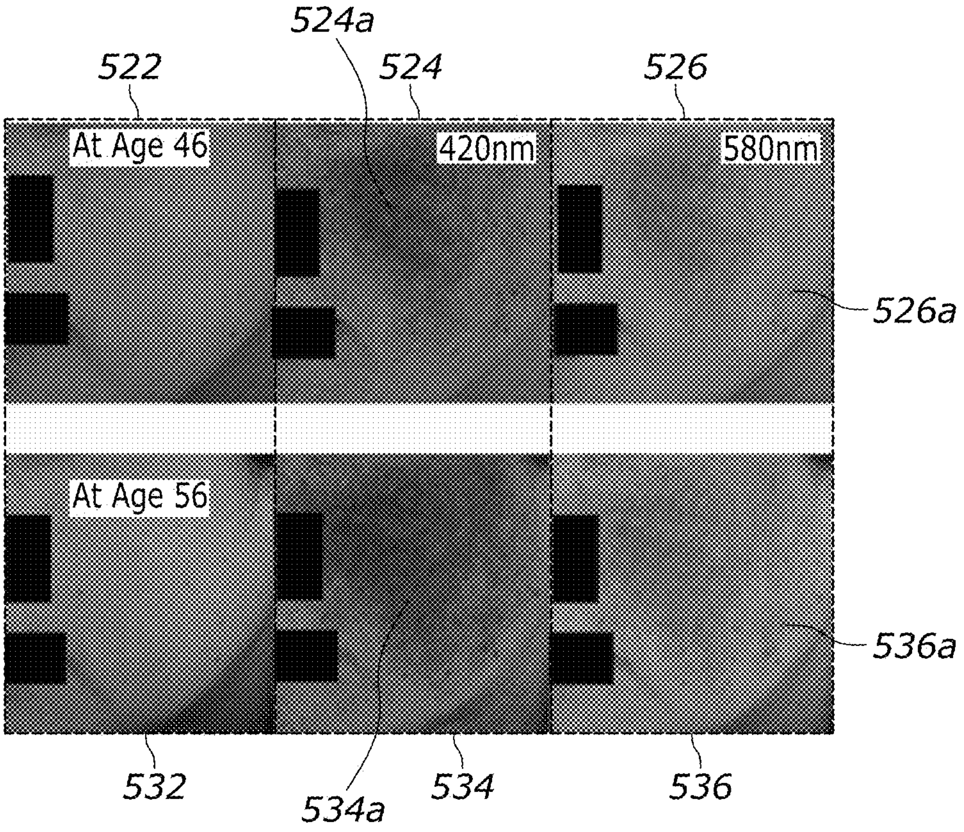
FIG. 5B illustrates example RGBs images with corresponding HS images at various wavelengths and depicting spectral changes detected in the images caused by aging, in accordance with various embodiments disclosed herein.

FIG. 5B illustrates example RGBs images (e.g., RGB images 522 and 532) with corresponding HS images (e.g., HS images 524, 526, 534, and 536) at various wavelengths (e.g., 420 nm and 580 nm) and depicting spectral changes detected in the images caused by aging, in accordance with various embodiments disclosed herein. As shown, RGB image 522 is a digital image of a user of a certain age (e.g., age 46), which may be determined from age data as provided as input. RGB image 522 is associated with HS images 524 and 526, which were generated or captured at different spectral wavelengths and, thus, are associated with different spectral wavelength band values (e.g., 420 nm and 580 nm, respectively). The HS images may be those captured by an HS sensor or camera and/or be generated images, e.g., reconstructed HS images as described herein.

Similarly, as shown, RGB image 532 is a digital image of the same user at a different age (e.g., age 56), which may be determined from age data as provided as input. RGB image 532 is associated with HS images 534 and 536, which were generated or captured at different spectral wavelengths and, thus, are associated with different spectral wavelength band values (e.g., 420 nm and 580 nm, respectively). The HS images may be those captured by an HS sensor or camera and/or be generated images, e.g., reconstructed HS images as described herein.

Each of the RGB image 522 and the RGB image 532 may represent training data, input data, and/or output of one or more of the AI models (e.g., HS reconstruction model) as described herein. Similarly, each of the HS images 524, 526, 534, and 536 may represent training data, input data, and/or output of one or more of the AI models (e.g., HS reconstruction model) as described herein.

The HS images, as captured at different time periods, illustrate longitudinal facial aging data demonstrating spectral changes (e.g., including skin conditions, e.g., such as different skin textures, such as skin texture 524*a* compared to skin texture 534*a*, or spots such as spot 526*a* compared to spot 536*a*, or other skin conditions) caused by aging. Such data may be used to train AI models (e.g., HS reconstruction model) as described herein.

Figure 5C:
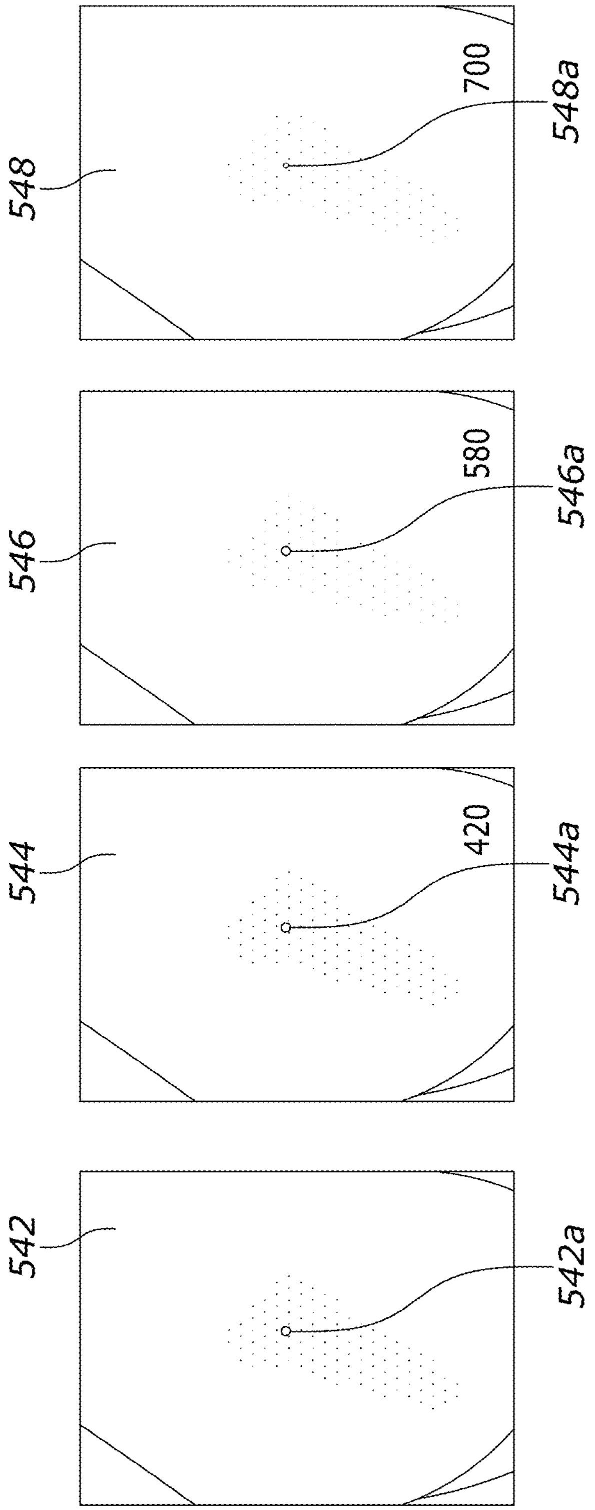
FIG. 5C illustrates an example RGB image with corresponding HS images at various wavelengths and depicting spectral characteristics of underarm color, in accordance with various embodiments disclosed herein.

FIG. 5C illustrates an example RGB image 542 with corresponding HS images (e.g., HS images 544, 546, and 548) at various wavelengths (e.g., 420 nm, 580 nm, and 700 nm) and depicting spectral characteristics of underarm color, in accordance with various embodiments disclosed herein. As shown, RGB image 542 is a digital image of a user's underarm area having skin coloring 542*a* in a skin area. RGB image 542 is associated with HS images 544, 546, and 548, which were generated or captured at different spectral wavelengths and, thus, are associated with different spectral wavelength band values (e.g., 420 nm, 580 nm, and 700 nm, respectively). The HS images may be those captured by an HS sensor or camera and/or be generated images, e.g., reconstructed HS images as described herein.

The HS images as captured at different time periods illustrate longitudinal facial aging data demonstrating spectral changes (e.g., including skin conditions, e.g., such as skin coloring as shown for skin coloring 542*a*, 544*a*, 546*a*, and 548*a*) caused by issues of skin in the underarm skin area of the body. Such data may be used to train AI models (e.g., HS reconstruction model) as described herein. The images, across various spectral wavelength bands, can be used to determine skin conditions associated with underarm color issues.

Figure 5D:
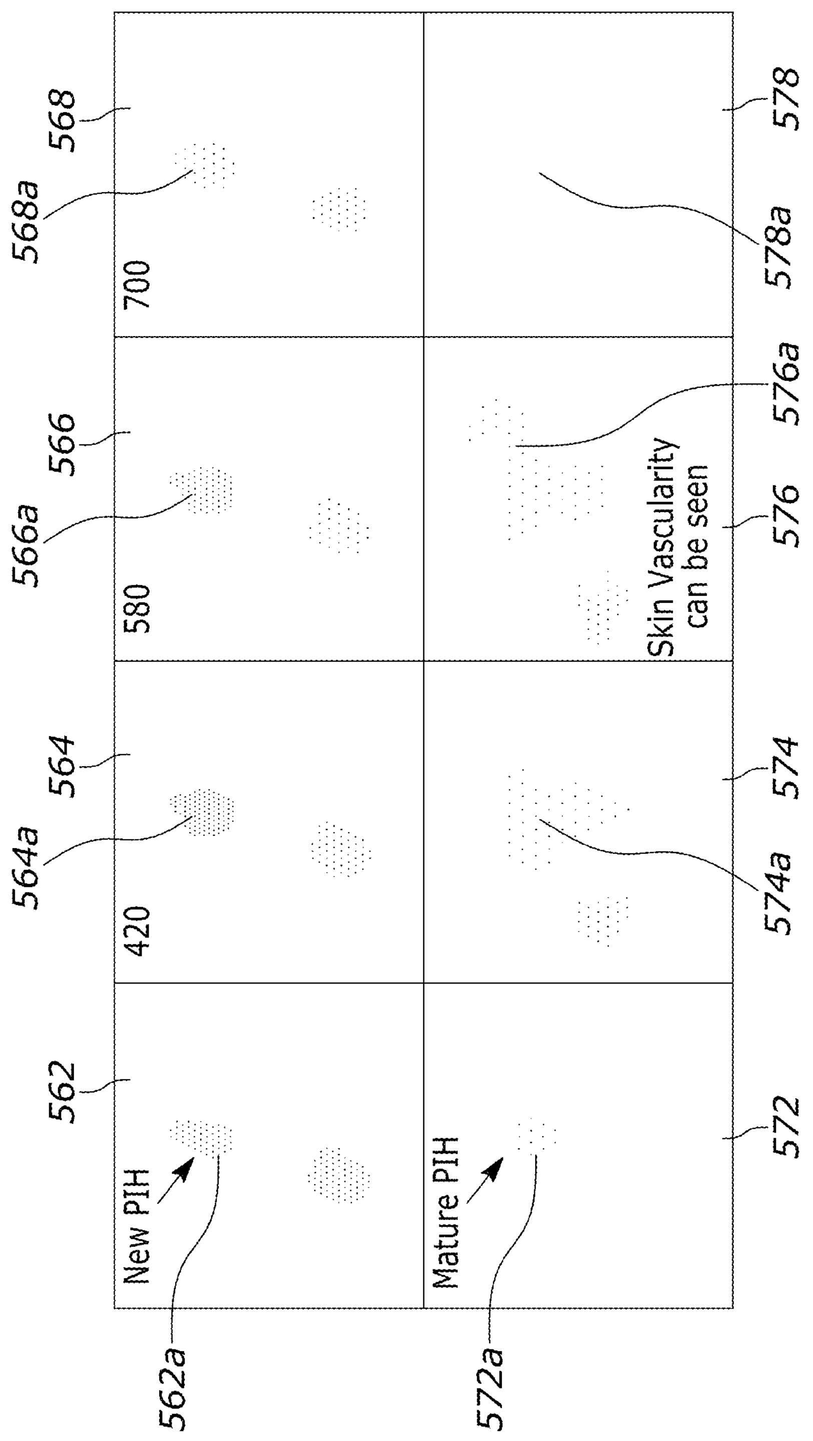
FIG. 5D illustrates an example RGB images with corresponding HS images at various wavelengths and depicting skin spots, in accordance with various embodiments disclosed herein.

FIG. 5D illustrates an example RGB images (e.g., RGB images 562 and 572) with corresponding HS images (e.g., HS images 564, 566, 568, 574, 576, and 578) at various wavelengths (e.g., 420 nm, 580 nm, and 700 nm) and depicting skin spots, in accordance with various embodiments disclosed herein. As shown, RGB image 562 is a digital image of a skin area of user comprising a post inflammatory hyperpigmentation (PIH) lesion 562*a* at a first time. RGB image 562 is associated with HS images 564, 566, and 568, which were generated or captured at different spectral wavelengths and, thus, are associated with different spectral wavelength band values (e.g., 420 nm, 580 nm, and 700 nm, respectively), and each showing the PIH lesions 564*a*, 566*a*, 568*a* at the respective wavelengths. The HS images may be those captured by an HS sensor or camera and/or be generated images, e.g., reconstructed HS images as described herein.

As shown, RGB image 562 is a digital image of the skin area of user comprising a PIH lesion 572*a* at a second time. PIH lesion 572*a* may illustrate PIH lesion 562*a* at a later date, e.g., a few months later. RGB image 572 is associated with HS images 574, 576, and 578, which were generated or captured at different spectral wavelengths and, thus, are associated with different spectral wavelength band values (e.g., 420 nm, 580 nm, and 700 nm, respectively), and each showing the PIH lesions 574*a*, 576*a*, 578*a* at the respective wavelengths. The HS images may be those captured by an HS sensor or camera and/or be generated images, e.g., reconstructed HS images as described herein.

Each of the RGB image 562 and the RGB image 572 may represent training data, input data, and/or output of one or more of the AI models (e.g., HS reconstruction model) as described herein. Similarly, each of the HS images 564, 566, 568, 574, 576, and 578 may represent training data, input data, and/or output of one or more of the AI models (e.g., HS reconstruction model) as described herein.

The spectral characteristics of new PIH lesions (e.g., PIH lesions 564*a*, 566*a*, 568*a*) compared to mature PIH lesions (e.g., PIH lesions 574*a*, 576*aa*, 578*a*) illustrate distinct differences detectable within the pixel data across various spectral wavelength defining spot spectra. Though a mature spot (e.g., mature spot 572*a*) is only older than 3 months, increased vascularity is detectable in the HS images, which has some similarity to solar lentigo.

Figure 5E:
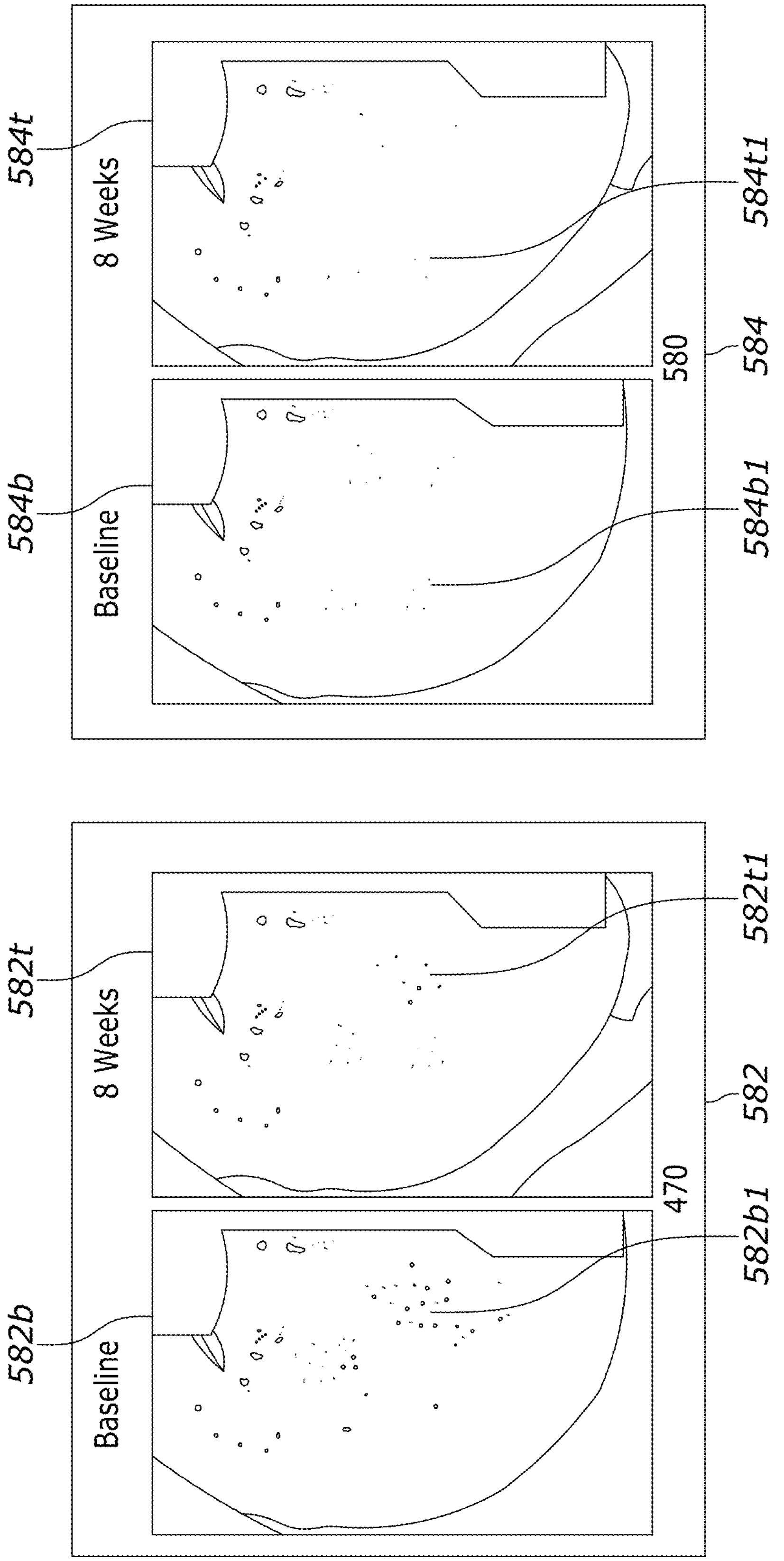
FIG. 5E illustrates example baseline reconstructed HS images with corresponding time lagged reconstructed HS images at various wavelengths and depicting effects and improvements of an active ingredient or otherwise skin product on the skin of users, in accordance with various embodiments disclosed herein.

FIG. 5E illustrates example baseline reconstructed HS images (e.g., HS images 582*b* and 584*b*) with corresponding time lagged reconstructed HS images (e.g., HS images 582*t* and 584*t*) at various wavelengths (e.g., 470 nm, and 580 nm) and depicting effects and improvements of an active ingredient or otherwise skin product on the skin of users, in accordance with various embodiments disclosed herein. As shown, HS image 582*b* is a baseline image of a user of at a first time. HS image 582*b* shows a skin condition 582*b*1 (e.g., a skin texture, e.g., wrinkle) of the user at the first time. HS image 582*t* is a time lagged image of a user of at a second time (e.g., 8 weeks from the first time). HS image 582*t* shows the skin condition 582*t*1 (e.g., a skin texture) of the user at the second time. Each of HS image 582*b* and HS image 582*t* were generated or captured at a given spectral wavelength and, thus, are associated with a spectral wavelength band value (e.g., at 420 nm). The HS images may be those captured by an HS sensor or camera and/or be generated images, e.g., reconstructed HS images as described herein.

Further as shown, HS image 584*b* is a baseline image of a user of at a first time. HS image 584*b* shows a skin condition 584*b*1 (e.g., a spot) of the user at the first time. HS image 584*t* is a time lagged image of a user of at a second time (e.g., 8 weeks from the first time). HS image 584*t* shows the skin condition 584*t*1 (e.g., the spot) of the user at the second time. Each of HS image 584*b* and HS image 584*t* were generated or captured at a given spectral wavelength and, thus, are associated with a spectral wavelength band value (e.g., at 580 nm). The HS images may be those captured by an HS sensor or camera and/or be generated images, e.g., reconstructed HS images as described herein.

Each of the HS images 582*b*, 582*t*, 584*b*, and 584*t* may represent training data, input data, and/or output of one or more of the AI models (e.g., HS reconstruction model) as described herein.

Each of the time lagged images 582*t* and 584*t* illustrate an improvement when low PH niacinamide is applied, where the improvement is shown at each of the different spectral bands (e.g., 470 nm 580 nm).

Figure 6:
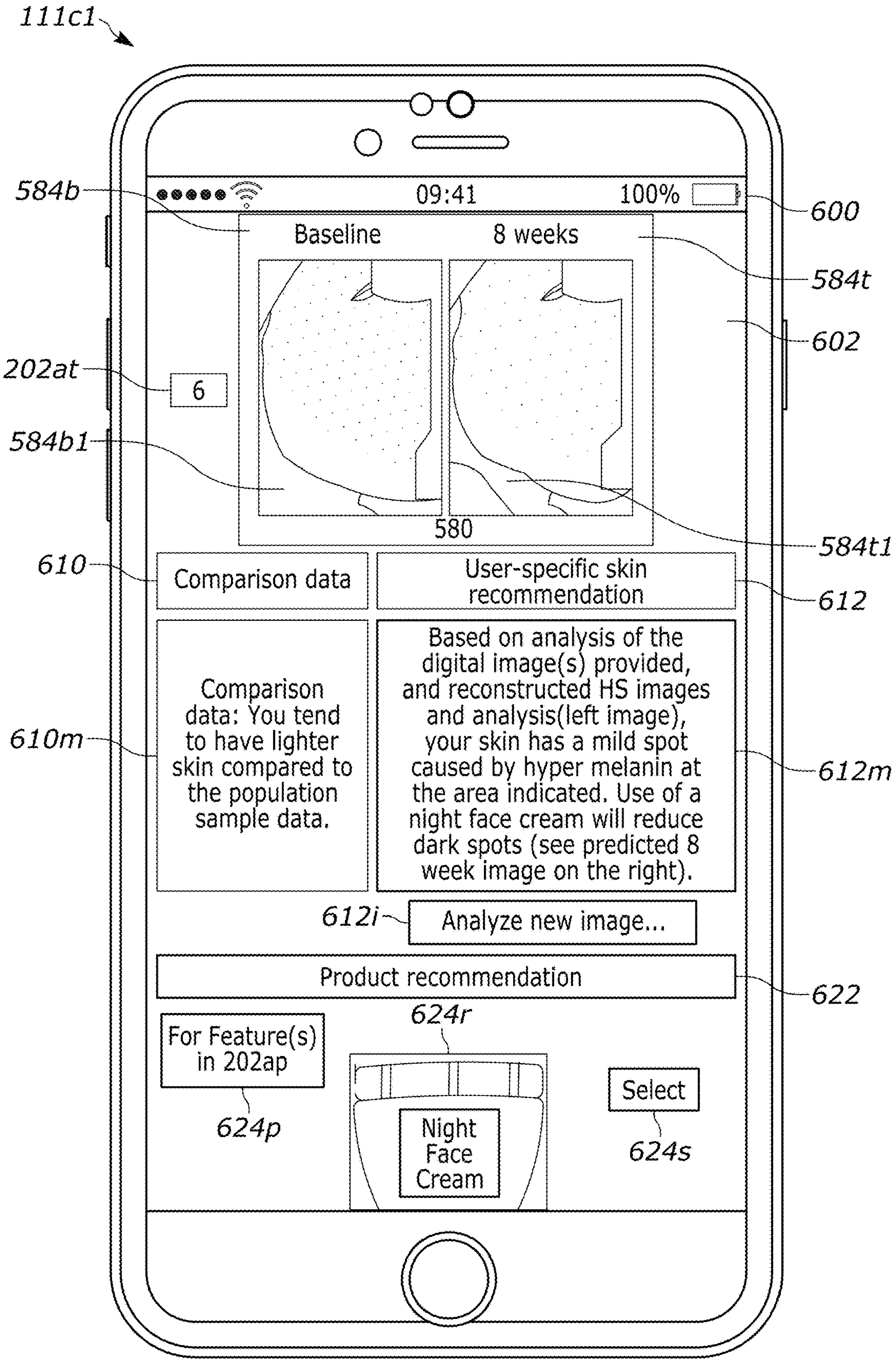
FIG. 6 illustrates an example user interface as rendered on a display screen of a user computing device in accordance with various embodiments disclosed herein.

FIG. 6 illustrates an example user interface 602 as rendered on a display screen 600 of a user computing device (e.g., user computing device 111*c*1) in accordance with various embodiments disclosed herein. For example, as shown in the example of FIG. 6, user interface 602 may be implemented or rendered via an application (app) executing on user computing device 111*c*1. For example, as shown in the example of FIG. 6, user interface 602 may be implemented or rendered via a native app executing on user computing device 111*c*1. In the example of FIG. 6, user computing device 111*c*1 is a user computer device as described for FIG. 1, e.g., where 111*c*1 is illustrated as an APPLE iPhone that implements the APPLE iOS operating system and that has display screen 600. User computing device 111*c*1 may execute one or more native applications (apps) on its operating system, including, for example, imaging app as described herein. Such native apps may be implemented or coded (e.g., as computing instructions) in a computing language (e.g., SWIFT) executable by the user computing device operating system (e.g., APPLE iOS) by the processor of user computing device 111*c*1.

Additionally, or alternatively, user interface 602 may be implemented or rendered via a web interface, such as via a web browser application, e.g., Safari and/or Google Chrome app(s), or other such web browser or the like.

As shown in the example of FIG. 6, user interface 602 comprises reconstructed HS images of a user's skin. As shown, user interface 602 depicts reconstructed HS image 584*b* (a baseline image) and HS image 584*t* (a time lagged image) as described herein for FIG. 5E. In the example of FIG. 6, reconstructed HS image 584*b* may represent an HS image that was reconstructed or otherwise created based on a digital image taken of the user's skin (e.g., by a digital camera of mobile device 111*c*1) and sent to imaging server (s) 102 and/or otherwise processed by mobile device 111*c*. For example, reconstructed HS image 584*b* may have been reconstructed or otherwise created from the AI model(s) 108 and/or 108*a*, such as the HS reconstruction model 108, skin mapping model, and/or other AI models, as described herein.

Reconstructed HS image 584*t* may comprise an image as output by simulation model when reconstructed HS image 584*b* was provided to simulation model as input. In the example of FIG. 6, reconstructed HS image 584*b* depicts a simulated image depicting a simulated area of the user's skin as predicted to appear after treatment of at least one skin care composition that includes an active ingredient for treating skin conditions identified by the AI model(s).

In still further aspects, either reconstructed HS image 584*b* (a baseline image) and/or HS image 584*t* (a time lagged image) may be replaced a digital image (RGB image) for display on user interface 602, so that the user may view a digital image instead of HS image. HS image 584*b* (a baseline image) may be the original digital image as submitted by the user and/or may be a generated digital image that is created or reconstructed from HS image 584*b*. HS image 584*t* (a time lagged image) may be a digital image a generated digital image that is created or reconstructed from HS image 584*t*, e.g., after it is output by simulation model.

As shown for FIG. 6, the computing device (e.g., imaging server(s) 102) may depict the HS image 584*b* and HS image 584*t* regarding skin condition (e.g., skin condition 584*b* and skin condition 584*t*, respectively) identifiable within the pixel data of the new image. For example, HS image 584*t* may include a new graphical representation (e.g., new RGB features or pixels and/or new HS features or pixels) showing what the user's skin is expected to look like after the user used a night face cream). The HS image 584*t* may include precited pixels or otherwise features showing that the user has successfully used night face cream to reduce melanin as detected with the pixel data of the originally provided digital image.

It should be understood that while an image of FIG. 5E is used as an example for FIG. 6, additional and/or different example images, either described herein or otherwise, may be used to show generation of reconstructed HS images and simulated images as described herein.

In the example of FIG. 6, HS image 584*b* (a baseline image) and/or HS image 584*t* (a time lagged image) may be annotated with one or more graphics (e.g., areas of pixel data) or textual rendering(s) (e.g., text 202*at*) corresponding to various features identifiable within the pixel data comprising a portion of a skin area of the user. For example, an area of pixel data may be annotated or otherwise identified to highlight the area or feature(s) within the pixel data (e.g., feature data and/or raw pixel data) by the AI model(s) (e.g., AI model(s) 108). In the example of FIG. 6, the area of pixel data indicates features, e.g., skin condition 584*b*1 and/or skin condition 584*t*1 (showing a skin spot at different times) identified in the respective images. The skin condition may indicate a melanin spot (e.g., for pixels at or near skin condition 584*b*1 and/or 584*t*1) and may show other features shown in relative skin area, for example, as described herein. In various embodiments, any of the skin conditions as described herein may be highlighted or otherwise annotated when rendered on display screen 600.

Textual rendering (e.g., text 202*at*) shows a user-specific attribute or feature (e.g., value "6") which may indicate that the pixel(s) near or at skin condition 584*b*1 and/or 584*t*1 has a spot classification or prediction of 8 for coloring of the skin at that area. The value of 6 (on a scale of 1-10) may indicate indicates that the user has a mild or otherwise enhanced color anomaly compared to the user's other skin in the given skin area or otherwise as compared to other users (e.g., comparison data) such that the user would likely benefit from using a product to improve their skin quality and or appearance (e.g., to normalize the spot or otherwise skin discoloration). It is to be understood that other textual rendering types or values are contemplated herein, where textual rendering types or values may be rendered, for example, such as identifications for melanin, hemoglobin, acne, wrinkles., and/or other skin conditions as described herein.

Additionally, or alternatively, other values, such as mapping data (e.g., pixel based data defining skin chromophore concentration and distribution of the user, a scattering map for the user, a collagen concentration and distribution for the user, an epidermal thickness of the user, an epidermal thickness map of the user, a dermal thickness of the user, and a dermal thickness map of the user, a hydration map of the user, may be output and/or overlaid on or with of a digital image and/or HS image, e.g., such as HS image 584*b* (a baseline image) and/or HS image 584*t* (a time lagged image). Such output may comprise a graphical representation shown on user interface 602 (e.g., either to indicate a degree or quality of a given skin condition, e.g., a high ID of 9 or a low ID of 3 (e.g., low RGB and/or L*a*b* pixel values). Such mapping data or otherwise, that show a proportionate value or otherwise corresponding relation between the skin condition along a given skin condition severity scale (e.g., scale between 1-10, where 1 is the least skin severity and 10 is the most skin severity that the model has been trained upon with respect to training images). The values may be provided as raw values, absolute scores, percentage based, or other numerical or textual values. Additionally, or alternatively, such values may be presented with textual or graphical indicators indicating whether or not a value is representative of positive results (e.g., low discoloration indicating low sun exposure or skin irritation), negative results (e.g., high discoloration indicating excessive sun exposure or skin irritation), or acceptable results (average or acceptable values).

User interface 602 may also include or render comparison data 610. In the embodiment of FIG. 6, the comparison data 610 comprises a message 610*m* to the user designed to indicate the to the user the user's skin type compared to other users of a selected population sample, along with a brief description of such comparison data. As shown in the example of FIG. 6, message 610*m* indicates to a user that the user has lighter skin compared to the population sample, e.g., the population sample data that the population model was trained on.

User interface 602 may also include or render a user-specific skin recommendation 612. For example, the imaging app may render, on a display screen of a computing device, at least one user-specific skin recommendation based on the analysis of the images, e.g., HS image 584*b* (a baseline image) and/or HS image 584*t* (a time lagged image). In various aspects, the user-specific skin recommendation may comprise a textual recommendation, an imaged based recommendation, and/or virtual rendering of the at least the portion of the skin area of the user. For example, in the embodiment of FIG. 6, user-specific skin recommendation 612 comprises a message 612*m* to the user designed to address at least one feature identifiable within the pixel data comprising the portion of a skin area of the user's skin. As shown in the example of FIG. 6, message 612*m* recommends to the user to use a night face cream to help reduce dark spots. The night face cream product may be a composition of hydroxycinnamic acids (HCAs) and niacinamide at a low pH as described herein. The product recommendation can be made based on the identified skin condition 584*b*1 and/or skin condition 584*t*1 (showing a skin spot at different times) identified in the respective images suggesting that the image of the user depicts a mild degree of discoloration, where the night cream product is designed to address discoloration detected, predicted, or classified in the pixel data of images (e.g., HS image 584*b* (a baseline image) and/or HS image 584*t* (a time lagged image) or otherwise assumed based on the pixel data, or classification, comparison data of the user, the one or more reconstructed HS images of the user, and/or the mapping data of the user as output by the AI models 108. The product recommendation can be correlated to the identified feature within the pixel data, and the user computing device 111*c*1 and/or server(s) 102 can be instructed to output the product recommendation when the feature (e.g., hyper melanin) is identified or classified.

User interface 602 may also include or render a section for a specific product recommendation 622 for a manufactured product 624*r* (e.g., night face cream as described above). The product recommendation 622 may correspond to the user-specific skin recommendation 612, as described above. For example, in the example of FIG. 6, the user-specific skin recommendation 612 may be displayed on display screen 600 of user computing device 111*c*1 with instructions (e.g., message 612*m*) for treating, with the manufactured product (manufactured product 624*r* (e.g., night face cream)) at least one feature (e.g., mild spot with value 6 related to melanin at pixels near or at skin condition 584*b*1 and/or skin condition 584*t*1) identifiable in the pixel data (e.g., of HS image 584*b* (a baseline image) and/or HS image 584*t* (a time lagged image)) comprising pixel data of at least a portion of a skin area of the user's skin.

As shown in FIG. 6, user interface 602 recommends a product (e.g., manufactured product 624*r* (e.g., night face cream)) based on the user-specific skin recommendation 612 and/or analysis of digital image(s) and/or HS images, e.g., HS image 584*b* (a baseline image) and/or HS image 584*t* (a time lagged image). In the example of FIG. 6, analysis of image(s) (e.g., HS image 584*b* (a baseline image) and/or HS image 584*t* (a time lagged image)) of AI model(s) (e.g., AI model(s) 108), and/or output thereof, may be used to generate or identify recommendations for corresponding product(s). Such recommendations may include products such as night face cream, skin exfoliants, skin moisturizers, moisturizing treatments, information about avoiding excessive sun exposure, and the like to address the user-specific issue as detected within the pixel data by the AI model(s) (e.g., AI model(s) 108 and/or AI model(s) 108*a*).

In the example of FIG. 6, user interface 602 renders or provides a recommended product (e.g., manufactured product 624*r*) as determined by AI model(s) (e.g., AI model(s) 108) and its related image analysis of images (e.g., HS image 584*b* (a baseline image) and/or HS image 584*t* (a time lagged image)) and its pixel data and various features. In the example of FIG. 6, this is indicated and annotated (624*p*) on user interface 602.

User interface 602 may further include a selectable UI button 624*s* to allow the user (e.g., the user depicted in the images HS image 584*b* (a baseline image) and/or HS image 584*t* (a time lagged image)) to select for purchase or shipment the corresponding product (e.g., manufactured product 624*r*). In some embodiments, selection of selectable UI button 624*s* may cause the recommended product(s) to be shipped to the user (e.g., user of image 202*a*) and/or may notify a third party that the individual is interested in the product(s). For example, either user computing device 111*c*1 and/or imaging server(s) 102 may initiate, based on the user-specific skin condition as identified by skin condition 584*b*1 and/or skin condition 584*b*1 in the pixel data or other data as defined herein, the manufactured product 624*r* (e.g., night face cream) for shipment to the user. In such embodiments, the product may be packaged and shipped to the user.

In various embodiments, digital images and/or reconstructed HS images (e.g., such as HS image 584*b* (a baseline image) and/or HS image 584*t* (a time lagged image)), with graphical annotations (e.g., area of pixel data regarding skin conditions 584*b*1 and 584*t*1), textual annotations (e.g., text 202*at*), and other data (e.g., mapping data or comparison data) may be transmitted, via the computer network (e.g., from an imaging server 102 and/or one or more processors) to user computing device 111*c*1, for rendering on display screen 600. In other embodiments, no transmission to the imaging server of the user's specific image occurs, where such data may instead be generated locally, by the AI model(s) (e.g., AI model(s) 108) executing and/or implemented on the user's mobile device (e.g., user computing device 111*c*1) and rendered, by a processor of the mobile device, on display screen 600 of the mobile device (e.g., user computing device 111*c*1).

In some embodiments, any one or more of images or reconstructed HS images, with graphical annotations (e.g., area of pixel data regarding skin conditions 584*b*1 and 584*t*1), textual annotations (e.g., text 202*at*), mapping data, comparison data, user-specific skin recommendation 612, and/or product recommendation 622 may be rendered (e.g., rendered locally on display screen 600) in real-time or near-real time during or after receiving, the image having the skin area of the user's skin. In embodiments where the image is analyzed by imaging server(s) 102, the image may be transmitted and analyzed in real-time or near real-time by imaging server(s) 102.

In some embodiments, the user may provide a new image that may be transmitted to imaging server(s) 102 for updating, retraining, or reanalyzing by AI model(s) 108. In other embodiments, a new image that may be locally received on computing device 111*c*1 and analyzed, by AI model(s) 108*a*, on the computing device 111*c*1.

In addition, as shown in the example of FIG. 6, the user may select selectable button 612*i* for reanalyzing (e.g., either locally at computing device 111*c*1 or remotely at imaging server(s) 102) a new image. Selectable button 612*i* may cause user interface 602 to prompt the user to attach for analyzing a new image. Imaging server(s) 102 and/or a user computing device such as user computing device 111*c*1 may receive a new image comprising pixel data of at least a portion of a skin area of the user's skin. The new image may be captured by the imaging device. The new image may be a digital image comprising pixel data of at least a portion of a skin area of the user's skin. The AI model(s) (e.g., AI model(s) 108), executing on the memory of the computing device (e.g., imaging server(s) 102), may analyze the new image captured by the imaging device to reconstruct HS image(s) of the user and/or determine or output other information of AI model(s) as described herein.

In various embodiments, the new user-specific spot classification and/or the new user-specific skin recommendation may be transmitted via the computer network, from server(s) 102, to the user computing device of the user for rendering on the display screen 600 of the user computing device (e.g., user computing device 111*c*1).

In other embodiments, no transmission to the imaging server of the user's new image occurs, where the new user-specific spot classification and/or the new user-specific skin recommendation (and/or product specific recommendation) may instead be generated locally, by the AI model(s) (e.g., AI model(s) 108*a*) executing and/or implemented on the user's mobile device (e.g., user computing device 111*c*1) and rendered, by a processor of the mobile device, on a display screen of the mobile device (e.g., user computing device 111*c*1).

Aspects of the Disclosure

The following aspects are provided as examples in accordance with the disclosure herein and are not intended to limit the scope of the disclosure.

Aspect 1. An artificial intelligence (AI)-based system configured to generate and evaluate reconstructed multispectral images depicting skin, the AI-based system comprising: one or more processors; one or more memories communicatively coupled to the one or more processors; an application (app) stored in the one or more memories and comprising computing instructions configured to execute on the one or more processors; a hyper-spectral (HS) reconstruction model, accessible by the app, and trained with pixel data of a plurality of digital images depicting human skin, the HS reconstruction model configured to output one or more reconstructed HS images, wherein each HS image of the one or more reconstructed HS images comprises a pixel-based image, and wherein each HS image of the one or more reconstructed HS images is emulated at one or more spectral bands; a skin attribute model, accessible by the app, and trained with skin attribute data and the one or more spectral bands, the skin attribute model configured to output one more skin attributes defining one or more effects of human skin when exposed to the one or more spectral bands; a skin mapping model, accessible by the app, and trained on the one or more reconstructed HS images as outputted by the HS reconstruction model, the skin mapping model configured to output mapping data comprising at least one of the following: pixel-based data defining skin chromophore concentration and distribution, scattering map, collagen concentration and distribution, epidermal thickness, dermal thickness, and an epidermal thickness map, a dermal thickness map, based on the one or more reconstructed HS images as input; a cosmetic attribute model, accessible by the app, and trained on the reconstructed HS images and the mapping data, the cosmetic attribute model configured to output one or more cosmetic attributes detectable within the reconstructed HS images based on the mapping data; and a population model, accessible by the app, and trained on a plurality of HS images of a selected population sample, wherein the population model is configured to output comparison data when provided with one or more of: the reconstructed HS images, the mapping data, and/or the one or more cosmetic attributes, wherein the computing instructions of the app when executed by the one or more processors, cause the one or more processors to: (a) receive one or more digital images of a user, the one or more digital images depicting pixel data of a skin area of the user, (b) input the one or more digital images into the HS reconstruction model, wherein the HS reconstruction model outputs one or more reconstructed HS images of the user, the one or more reconstructed HS images of the user having one or more corresponding spectral band values, (c) input the one or more corresponding spectral band values into the skin attribute model, wherein the skin attribute model outputs one more skin attributes of the user as determined when exposed to spectral bands defined by the one or more corresponding spectral band values, (d) input the one or more reconstructed HS images of the user into the skin mapping model, wherein the skin mapping model outputs mapping data of the user comprising one or more of the following: pixel based data defining skin chromophore concentration and distribution of the user, a scattering map for the user, a collagen concentration and distribution of the user, an epidermal thickness of the user, a dermal thickness of the user, an epidermal thickness map of the user, and an dermal thickness of the user based on the one or more reconstructed HS images of the user, (e) input the one or more reconstructed HS images of the user and the mapping data of the user into the cosmetic attribute model, wherein the cosmetic attribute model outputs one or more cosmetic attributes of the user detectable within the reconstructed HS images based on the mapping data, (f) input the one or more reconstructed HS images of the user, the mapping data of the user, and the one or more cosmetic attributes of the user into the population model, wherein the population model outputs user-specific comparison data of the user comparing the skin area of the user to skin areas of the selected population sample, and (g) display, on a display screen, at least one of: user-specific comparison data of the user, the one or more reconstructed HS images of the user, or the mapping data of the user.

Aspect 2. The AI-based system of aspect 1, wherein the HS reconstruction model comprises a deep learning model.

Aspect 3. The AI-based system of any one of the preceding aspects, wherein the deep learning model comprises a convolution neural network (CNN), a vision transformer, a recurrent neural network (RNN), a vision transformer, a generative adversarial network (GAN), a diffusion model, and/or a distillation model.

Aspect 4. The AI-based system of aspect 2, wherein the deep learning model is trained with one or more sets of skin image pairs, wherein each skin image pair of the one or more sets of skin image pairs comprises: (1) a digital image of a skin of a user; and (2) a hyperspectral image of the skin of the user.

Aspect 5. The AI-based system of aspect 4, wherein the digital image and the hyperspectral image comprise one or more of: (a) images depicting one or more skin areas of the user; (b) images depicting one or more types of skin tones, ages, and/or phenotypes.

Aspect 6. The AI-based system of any one of the preceding aspects, wherein the plurality of HS images of the selected population sample upon which the population model is trained comprises a population data set defining a plurality of skin areas, a plurality of skin tones, a plurality of ages, and/or a plurality of phenotypes.

Aspect 7. The AI-based system of any one of the preceding aspects, wherein the HS reconstruction model outputs the one or more reconstructed HS images in real-time or near real-time.

Aspect 8. The AI-based system of any one of the preceding aspects, wherein the user-specific comparison data of the user, the one or more reconstructed HS images of the user, and/or the mapping data of the user is displayed on the display screen in real-time or near real-time.

Aspect 9. The AI-based system of any one of the preceding aspects further comprising a simulation model trained on one or more outputs of the HS reconstruction model and data defining one or more skin care compositions each comprising one or more active ingredients known to treat the one or more cosmetic attributes, the simulation model configured to input at least one HS image of the user of the one or more reconstructed HS images of the user, and the simulation model configured to output a simulated image comprising at least one of: (a) a simulated reconstructed HS image; (b) a simulated digital image; and/or (c) a reconstructed digital image based on a reconstructed HS image, wherein the simulated image depicts a simulated area of the user's skin as predicted to appear after treatment of at least one of the skin care compositions.

Aspect 10. The AI-based system of aspect 9, wherein the simulated image is displayed on the display screen.

Aspect 11. The AI-based system of aspect 9, wherein the computing instructions of the app when executed by the one or more processors, cause the one or more processors to: output a user-specific product recommendation for a manufactured product comprising a skin care composition selected from the one or more skin care compositions.

Aspect 12. The AI-based system of aspect 11, wherein the user-specific product recommendation is displayed on the display screen with instructions for treating, with the manufactured product, at least one feature identifiable in pixel data comprising a skin area of the user.

Aspect 13. The AI-based system of aspect 11, wherein the computing instructions of the app when executed by the one or more processors, cause the one or more processors to: initiate, based on the user-specific product recommendation, the manufactured product for shipment to the user.

Aspect 14. The AI-based system of any one of the preceding aspects, wherein at least one of the one or more processors comprises a processor of a mobile device.

Aspect 15. The AI-based system of any one of the preceding aspects, wherein the one or more processors comprises a server processor of a server, wherein the server is communicatively coupled to a computing device via a computer network, and where the app comprises a server app portion configured to execute on the one or more processors of the server and a computing device app portion configured to execute on one or more processors of the computing device, the server app portion configured to communicate with the computing device app portion, wherein the server app portion is configured to implement one or more of instructions a-g of claim 1.

Aspect 16. An artificial intelligence (AI)-based method for generating and evaluating reconstructed multi-spectral images depicting skin, the AI-based method comprising: (a) receiving, at an application (app) executing on one or more processors, one or more digital images of a user, the one or more digital images depicting pixel data of a skin area of the user; (b) inputting the one or more digital images into a hyper-spectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images comprises a pixel-based image, and wherein each HS image of the one or more reconstructed HS images is emulated at one or more spectral bands; (c) inputting the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands; (d) inputting the one or more reconstructed HS images of the user into a skin mapping model, wherein the skin mapping model outputs mapping data of the user comprising one or more of the following: pixel based data defining skin chromophore concentration and distribution of the user, a scattering map for the user, a collagen concentration and distribution, an epidermal thickness of the user, a dermal thickness of the user, an epidermal thickness map of the user, and a dermal thickness map of the user based on the one or more reconstructed HS images of the user, wherein the skin mapping model is accessible by the app and is trained on the one or more reconstructed HS images as outputted by the HS reconstruction model, and wherein the skin mapping model is configured to output mapping data comprising: pixel based data defining skin chromophore concentration and distribution, scattering map, collagen concentration and distribution, epidermal thickness, dermal thickness, an epidermal thickness map, a dermal thickness map, and a hydration map, based on the one or more reconstructed HS images as input; (e) inputting the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data; (f) inputting the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) displaying, on a display screen, at least one of: user-specific comparison data of the user, the one or more reconstructed HS images of the user, or the mapping data of the user.

Aspect 17. The AI-based method of aspect 16, wherein the HS reconstruction model comprises a deep learning model.

Aspect 18. The AI-based method of aspect 17, wherein the deep learning model comprises a convolution neural network (CNN), a vision transformer, a recurrent neural network (RNN), a vision transformer, a generative adversarial network (GAN), a diffusion model, and/or a distillation model.

Aspect 19. The AI-based method of either of aspect 17 or aspect 18, wherein the deep learning model is trained with one or more sets of skin image pairs, wherein each skin image pair of the one or more sets of skin image pairs comprises: (1) a digital image of a skin of a user; and (2) a hyperspectral image of the skin of the user.

Aspect 20. The AI-based method of any one of aspects 16-19, wherein the digital image and the hyperspectral image comprise one or more of: (a) images depicting one or more skin areas of the user; (b) images depicting one or more types of skin tones, ages, and/or phenotypes.

Aspect 21. The AI-based method of any one of aspects 16-20, wherein the plurality of HS images of the selected population sample upon which the population model is trained comprises a population data set defining a plurality of skin areas, a plurality of skin tones, a plurality of ages, and/or a plurality of phenotypes.

Aspect 22. The AI-based method of any one of aspects 16-21, wherein the HS reconstruction model outputs the one or more reconstructed HS images in real-time or near real-time.

Aspect 23. The AI-based method of any one of aspects 16-22, wherein the user-specific comparison data of the user, the one or more reconstructed HS images of the user, and/or the mapping data of the user is displayed on the display screen in real-time or near real-time.

Aspect 24. The AI-based method of any one of aspects 16-23 further comprising a simulation model outputting a simulated image comprising at least one of: (a) a simulated reconstructed HS image; (b) a simulated digital image; and/or (c) a reconstructed digital image based on a reconstructed HS image, wherein the simulated image depicts a simulated area of the user's skin as predicted to appear after treatment of at least one of one or more skin care compositions, and wherein the simulation model is trained on one or more outputs of the HS reconstruction model and data defining the one or more skin care compositions each comprising one or more active ingredients known to treat the one or more cosmetic attributes, and wherein the simulation model is configured to input at least one HS image of the user of the one or more reconstructed HS images of the user.

Aspect 25. The AI-based method of aspect 24, wherein the simulated image is displayed on the display screen.

Aspect 26. The AI-based method of aspect 24 further comprising outputting a user-specific product recommendation for a manufactured product comprising a skin care composition selected from the one or more skin care compositions.

Aspect 27. The AI-based method of aspect 26, wherein the user-specific product recommendation is displayed on the display screen with instructions for treating, with the manufactured product, at least one feature identifiable in pixel data comprising a skin area of the user.

Aspect 28. The AI-based method of aspect 26, wherein the computing instructions of the app when executed by the one or more processors, cause the one or more processors to: initiate, based on the user-specific product recommendation, the manufactured product for shipment to the user.

Aspect 29. The AI-based method of any one of aspects 16-28, wherein at least one of the one or more processors comprises a processor of a mobile device.

Aspect 30. A tangible, non-transitory computer-readable medium storing instructions for generating and evaluating reconstructed multi-spectral images depicting skin, that when executed by one or more processors cause the one or more processors to: (a) receive, at an application (app) executing on one or more processors, one or more digital images of a user, the one or more digital images depicting pixel data of a skin area of the user; (b) input the one or more digital images into a hyper-spectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images comprises a pixel-based image, and wherein each HS image of the one or more reconstructed HS images is emulated at one or more spectral bands; (c) input the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands; (d) input the one or more reconstructed HS images of the user into a skin mapping model, wherein the skin mapping model outputs mapping data of the user comprising one or more of the following: pixel based data defining skin chromophore concentration and distribution of the user, a scattering map for the user, a collagen concentration and distribution for the user, an epidermal thickness of the user, a dermal thickness of the user an epidermal thickness map of the user, a dermal thickness map of the user, and a hydration map, based on the one or more reconstructed HS images of the user, wherein the skin mapping model is accessible by the app and is trained on the one or more reconstructed HS images as outputted by the HS reconstruction model, and wherein the skin mapping model is configured to output mapping data comprising one or more of the following: pixel based data defining skin chromophore concentration and distribution, scattering map, collagen concentration and distribution, epidermal thickness, dermal thickness, an epidermal thickness map, and a hydration map, based on the one or more reconstructed HS images as input; (e) input the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data; (f) input the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) display, on a display screen, at least one of: user-specific comparison data of the user, the one or more reconstructed HS images of the user, or the mapping data of the user.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An artificial intelligence (AI)-based system configured to generate and evaluate reconstructed multi-spectral images depicting skin, the AI-based system comprising:

one or more processors;

one or more memories communicatively coupled to the one or more processors;

an application (app) stored in the one or more memories and comprising computing instructions configured to execute on the one or more processors;

a hyper-spectral (HS) reconstruction model, accessible by the app, and trained with pixel data of a plurality of digital images depicting human skin, the HS reconstruction model configured to output one or more reconstructed HS images, wherein each HS image of the one or more reconstructed HS images comprises a pixel-based image, and wherein each HS image of the one or more reconstructed HS images is emulated at one or more spectral bands;

a skin attribute model, accessible by the app, and trained with skin attribute data and the one or more spectral bands, the skin attribute model configured to output one more skin attributes defining one or more effects of human skin when exposed to the one or more spectral bands;

a skin mapping model, accessible by the app, and trained on the one or more reconstructed HS images as outputted by the HS reconstruction model, the skin mapping model configured to output mapping data comprising one or more of the following: pixel-based data defining skin chromophore concentration and distribution, scattering map, collagen concentration and distribution, epidermal thickness, dermal thickness, an epidermal thickness map, dermal thickness map, epidermal scattering map, dermal scattering map, and a hydration map, based on the one or more reconstructed HS images as input;

a cosmetic attribute model, accessible by the app, and trained on the reconstructed HS images and the mapping data, the cosmetic attribute model configured to output one or more cosmetic attributes detectable within the reconstructed HS images based on the mapping data; and a population model, accessible by the app, and trained on a plurality of HS images of a selected population sample, wherein the population model is configured to output comparison data when provided with one or more of: the reconstructed HS images, the mapping data, and/or the one or more cosmetic attributes, wherein the computing instructions of the app when executed by the one or more processors, cause the one or more processors to:

(a) receive one or more digital images of a user, the one or more digital images depicting pixel data of a skin area of the user, (b) input the one or more digital images into the HS reconstruction model, wherein the HS reconstruction model outputs one or more reconstructed HS images of the user, the one or more reconstructed HS images of the user having one or more corresponding spectral band values, (c) input the one or more corresponding spectral band values into the skin attribute model, wherein the skin attribute model outputs one more skin attributes of the user as determined when exposed to spectral bands defined by the one or more corresponding spectral band values, (d) input the one or more reconstructed HS images of the user into the skin mapping model, wherein the skin mapping model outputs mapping data of the user comprising one or more of the following: pixel based data defining skin chromophore concentration and distribution of the user, a collagen concentration and distribution of the user, a scattering map for the user, an epidermal thickness of the user, a dermal thickness of the user an epidermal thickness map of the user, a dermal thickness map of the user, and a hydration map, based on the one or more reconstructed HS images of the user, (e) input the one or more reconstructed HS images of the user and the mapping data of the user into the cosmetic attribute model, wherein the cosmetic attribute model outputs one or more cosmetic attributes of the user detectable within the reconstructed HS images based on the mapping data, (f) input the one or more reconstructed HS images of the user, the mapping data of the user, and the one or more cosmetic attributes of the user into the population model, wherein the population model outputs user-specific comparison data of the user comparing the skin area of the user to skin areas of the selected population sample, and (g) display, on a display screen, at least one of: user-specific comparison data of the user, the one or more reconstructed HS images of the user, or the mapping data of the user.

2. The AI-based system of claim 1, wherein the HS reconstruction model comprises a deep learning model.

3. The AI-based system of claim 2, wherein the deep learning model comprises a convolution neural network (CNN), a vision transformer, a recurrent neural network (RNN), a generative adversarial network (GAN), a diffusion model, and/or a distillation model.

4. The AI-based system of claim 2, wherein the deep learning model is trained with one or more sets of skin image pairs, wherein each skin image pair of the one or more sets of skin image pairs comprises: (1) a digital image of a skin of a user; and (2) a hyperspectral image of the skin of the user.

5. The AI-based system of claim 4, wherein the digital image and the hyperspectral image comprise one or more of: (a) images depicting one or more skin areas of the user; (b) images depicting one or more types of skin tones, ages, and/or phenotypes.

6. The AI-based system of claim 1, wherein the plurality of HS images of the selected population sample upon which the population model is trained comprises a population data set defining a plurality of skin areas, a plurality of skin tones, a plurality of ages, and/or a plurality of phenotypes.

7. The AI-based system of claim 1, wherein the HS reconstruction model outputs the one or more reconstructed HS images in real-time.

8. The AI-based system of claim 1, wherein the user-specific comparison data of the user, the one or more reconstructed HS images of the user, and/or the mapping data of the user is displayed on the display screen in real-time.

9. The AI-based system of claim 1 further comprising a simulation model trained on one or more outputs of the HS reconstruction model and data defining one or more skin care compositions each comprising one or more active ingredients known to treat the one or more cosmetic attributes, the simulation model configured to input at least one HS image of the user of the one or more reconstructed HS images of the user, and the simulation model configured to output a simulated image comprising at least one of: (a) a simulated reconstructed HS image; (b) a simulated digital image; and/or (c) a reconstructed digital image based on a reconstructed HS image, wherein the simulated image depicts a simulated area of the user's skin as predicted to appear after treatment of at least one of the skin care compositions.

10. The AI-based system of claim 9, wherein the simulated image is displayed on the display screen.

11. The AI-based system of claim 9, wherein the computing instructions of the app when executed by the one or more processors, cause the one or more processors to: output a user-specific product recommendation for a manufactured product comprising a skin care composition selected from the one or more skin care compositions.

12. The AI-based system of claim 11, wherein the user-specific product recommendation is displayed on the display screen with instructions for treating, with the manufactured product, at least one feature identifiable in pixel data comprising a skin area of the user.

13. The AI-based system of claim 11, wherein the computing instructions of the app when executed by the one or more processors, cause the one or more processors to:

initiate, based on the user-specific product recommendation, the manufactured product for shipment to the user.

14. The AI-based system of claim 1, wherein at least one of the one or more processors comprises a processor of a mobile device.

15. The AI-based system of claim 1, wherein the one or more processors comprises a server processor of a server, wherein the server is communicatively coupled to a computing device via a computer network, and where the app comprises a server app portion configured to execute on the one or more processors of the server and a computing device app portion configured to execute on one or more processors of the computing device, the server app portion configured to communicate with the computing device app portion, wherein the server app portion is configured to implement one or more of instructions a-g of claim 1.

16. An artificial intelligence (AI)-based method for generating and evaluating reconstructed multi-spectral images depicting skin, the AI-based method comprising:

(a) receiving, at an application (app) executing on one or more processors, one or more digital images of a user, the one or more digital images depicting pixel data of a skin area of the user;

(b) inputting the one or more digital images into a hyper-spectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images comprises a pixel-based image, and wherein each HS image of the one or more reconstructed HS images is emulated at one or more spectral bands;

(c) inputting the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands;

(d) inputting the one or more reconstructed HS images of the user into a skin mapping model, wherein the skin mapping model outputs mapping data of the user comprising one or more of the following: pixel based data defining skin chromophore concentration and distribution of the user, a scattering map for the user, collagen concentration and distribution of the user, an epidermal thickness of the user, a dermal thickness of the user, an epidermal thickness map of the user, and a dermal thickness map of the user, based on the one or more reconstructed HS images of the user, wherein the skin mapping model is accessible by the app and is trained on the one or more reconstructed HS images as outputted by the HS reconstruction model, and wherein the skin mapping model is configured to output mapping data comprising: pixel based data defining skin chromophore concentration and distribution, scattering map, collagen concentration and distribution, epidermal thickness, dermal thickness, an epidermal thickness map, and/or a dermal thickness map, based on the one or more reconstructed HS images as input;

(e) inputting the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data;

(f) inputting the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) displaying, on a display screen, at least one of: user-specific comparison data of the user, the one or more reconstructed HS images of the user, or the mapping data of the user.

17. The AI-based method of claim 16 further comprising a simulation model outputting a simulated image comprising at least one of: (a) a simulated reconstructed HS image; (b) a simulated digital image; and/or (c) a reconstructed digital image based on a reconstructed HS image, wherein the simulated image depicts a simulated area of the user's skin as predicted to appear after treatment of at least one of one or more skin care compositions, and wherein the simulation model is trained on one or more outputs of the HS reconstruction model and data defining the one or more skin care compositions each comprising one or more active ingredients known to treat the one or more cosmetic attributes, and wherein the simulation model is configured to input at least one HS image of the user of the one or more reconstructed HS images of the user.

18. The AI-based method of claim 17, wherein the simulated image is displayed on the display screen and wherein the method further comprises outputting a user-specific product recommendation for a manufactured product comprising a skin care composition selected from the one or more skin care compositions.

19. The AI-based method of claim 18, wherein the user-specific product recommendation is displayed on the display screen with instructions for treating, with the manufactured product, at least one feature identifiable in pixel data comprising a skin area of the user.

20. A tangible, non-transitory computer-readable medium storing instructions for generating and evaluating reconstructed multi-spectral images depicting skin, that when executed by one or more processors cause the one or more processors to:

(a) receive, at an application (app) executing on one or more processors, one or more digital images of a user, the one or more digital images depicting pixel data of a skin area of the user;

(b) input the one or more digital images into a hyperspectral (HS) reconstruction model, wherein the HS reconstruction model outputs one or more reconstructed HS images of the user, the one or more reconstructed HS images of the user having one or more corresponding spectral band values, wherein the HS reconstruction model is accessible by the app and is trained with pixel data of a plurality of digital images depicting human skin, wherein the HS reconstruction model is configured to output one or more reconstructed HS images, wherein each HS image of the one or more reconstructed HS images comprises a pixel-based image, and wherein each HS image of the one or more reconstructed HS images is emulated at one or more spectral bands;

(c) input the one or more corresponding spectral band values into a skin attribute model, wherein the skin attribute model outputs one more skin attributes of the user as determined when exposed to spectral bands defined by the one or more corresponding spectral band values, wherein the skin attribute model is accessible by the app and is trained with skin attribute data and the one or more spectral bands, wherein the skin attribute model is configured to output one more skin attributes defining one or more effects of human skin when exposed to the one or more spectral bands;

(d) input the one or more reconstructed HS images of the user into a skin mapping model, wherein the skin mapping model outputs mapping data of the user comprising: pixel based data defining skin chromophore concentration and distribution of the user, a scattering map for the user, collagen concentration and distribution, an epidermal thickness of the user, dermal thickness of the user, an epidermal thickness map of the user, and/or a dermal thickness map, based on the one or more reconstructed HS images of the user, wherein the skin mapping model is accessible by the app and is trained on the one or more reconstructed HS images as outputted by the HS reconstruction model, and wherein the skin mapping model is configured to output mapping data comprising one or more of the following: pixel based data defining skin chromophore concentration and distribution, scattering map, collagen concentration and distribution, epidermal thickness, an epidermal thickness map, and a dermal thickness map, based on the one or more reconstructed HS images as input;

(e) input the one or more reconstructed HS images of the user and the mapping data of the user into a cosmetic attribute model, wherein the cosmetic attribute model outputs one or more cosmetic attributes of the user detectable within the reconstructed HS images based on the mapping data, wherein the cosmetic attribute model is accessible by the app and is trained on the reconstructed HS images and the mapping data, and wherein the cosmetic attribute model is configured to output one or more cosmetic attributes detectable within the reconstructed HS images based on the mapping data;

(f) input the one or more reconstructed HS images of the user, the mapping data of the user, and the one or more cosmetic attributes of the user into a population model, wherein the population model outputs user-specific comparison data of the user comparing the skin area of the user to skin areas of a selected population sample, wherein the population model is accessible by the app and is trained on a plurality of HS images of the selected population sample, and wherein the population model is configured to output comparison data when provided with one or more of: the reconstructed HS images, the mapping data, and/or the one or more cosmetic attributes; and (g) display, on a display screen, at least one of: user-specific comparison data of the user, the one or more reconstructed HS images of the user, or the mapping data of the user.

* * * * *